(12) United States Patent
Kuriki

(10) Patent No.: US 8,586,874 B2
(45) Date of Patent: Nov. 19, 2013

(54) CONDUCTIVE SHEET, METHOD FOR USING CONDUCTIVE SHEET, AND CAPACITIVE TOUCH PANEL

(75) Inventor: Tadashi Kuriki, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 6 days.

(21) Appl. No.: 13/384,199

(22) PCT Filed: Nov. 19, 2010

(86) PCT No.: PCT/JP2010/071200
§ 371 (c)(1),
(2), (4) Date: Jan. 13, 2012

(87) PCT Pub. No.: WO2011/062301
PCT Pub. Date: May 26, 2011

(65) Prior Publication Data
US 2012/0118614 A1    May 17, 2012

(30) Foreign Application Priority Data

Nov. 20, 2009   (JP) .................................. 2009-265467
May 31, 2010    (JP) .................................. 2010-125371

(51) Int. Cl.
*H05K 1/02*    (2006.01)
(52) U.S. Cl.
USPC ............ 174/261; 174/250; 174/255; 345/173
(58) Field of Classification Search
USPC ........................................................ 174/255
See application file for complete search history.

(56) References Cited

U.S. PATENT DOCUMENTS

| 5,113,041 A | 5/1992 | Blonder et al. |
| 2006/0097991 A1* | 5/2006 | Hotelling et al. ............. 345/173 |
| 2009/0002337 A1* | 1/2009 | Chang ............................ 345/174 |
| 2010/0156840 A1* | 6/2010 | Frey et al. ...................... 345/174 |
| 2011/0102370 A1 | 5/2011 | Kono et al. |

FOREIGN PATENT DOCUMENTS

| JP | 2008-009921 A | 1/2008 |
| JP | 2008-153596 A | 7/2008 |
| JP | 2008-310551 A | 12/2008 |
| JP | 2009-009574 A | 1/2009 |
| JP | 2010-039537 A | 2/2010 |
| WO | 95/27334 A1 | 10/1995 |
| WO | WO 2009/108765 A2 | 9/2009 |
| WO | 2010/013679 A1 | 2/2010 |

* cited by examiner

*Primary Examiner* — Hoa C Nguyen
*Assistant Examiner* — Amol Patel
(74) *Attorney, Agent, or Firm* — Jean C. Edwards; Edwards Neils PLLC

(57) ABSTRACT

A conductive Sheet, a method for using conductive sheet, and a capacitive touch panel are provided. A first conductive sheet contains two or more conductive first large lattices and a first connection for electrically connecting the adjacent first large lattices on a first transparent substrate. The first large lattices each contain a combination of two or more small lattices, the first connection contains one or more medium lattices (a first medium lattice to a fourth medium lattice), and the pitch of the medium lattices is n times larger than that of the small lattices (in which n is a real number larger than 1).

17 Claims, 23 Drawing Sheets

CONDUCTIVE SHEET, METHOD FOR USING CONDUCTIVE SHEET, AND CAPACITIVE TOUCH PANEL

CROSS-REFERENCE TO RELATED APPLICATIONS

The present invention is a 35 U.S.C. 371 National Stage Entry of PCT/JP2010/071200, filed Nov. 19, 2010, which claims priority from Japanese Patent Application Nos. 2009-265467, filed on Nov. 20, 2009, and 2010-125371, filed on May 31, 2010, the contents of all of which are herein incorporated by reference in their entirety.

TECHNICAL FIELD

The present invention relates to a conductive sheet, a method for using a conductive sheet, and a capacitive touch panel, and for example to a conductive sheet suitable for use in a projected capacitive touch panel, a method for using a conductive sheet, and a capacitive touch panel.

BACKGROUND ART

Common capacitive touch panels are position input devices capable of detecting a human finger touch position based on an electrostatic capacitance change between the finger and a conductive film. Such capacitive touch panels include surface capacitive touch panels and projected capacitive touch panels. The surface capacitive touch panel has a simple structure but is incapable of simultaneously detecting two or more touch points (multi-touch detection). On the other hand, the projected capacitive touch panel has a structure containing a large number of electrodes arranged in a matrix, similar to a pixel structure of a liquid crystal display device, etc. More specifically, the structure is such that a plurality of electrodes are arranged and connected in series in the vertical direction to form a first electrode array, a plurality of the first electrode arrays are arranged in the horizontal direction, a plurality of electrodes are arranged and connected in series in the horizontal direction to form a second electrode array, a plurality of the second electrode arrays are arranged in the vertical direction, and capacitance changes are sequentially detected by the first and second electrode arrays to achieve multi-touch detection. Such conventional projected capacitive touch panels include a capacitive input device described in Japanese Laid-Open Patent Publication No. 2008-310551.

SUMMARY OF INVENTION

However, the capacitive input device described in Japanese Laid-Open Patent Publication No. 2008-310551 is disadvantageously poor in finger position detection accuracy because it is necessary to form gaps between first and second electrode arrays arranged on one main surface of a substrate to prevent short circuit of the first and second electrode arrays. Furthermore, the capacitive input device is disadvantageous in that electrode connections of the second electrode arrays are formed on electrode connections of the first electrode arrays with insulation layers in between to prevent short circuit of intersections (cross points) of the first and second electrode arrays, whereby the intersections have large thicknesses and appear as local black points in the touch panel surface to significantly deteriorate the visibility. In addition, mask patterns are required to form the insulation layers and the electrode connections thereon, thereby resulting in complicated production process and high production cost.

The problems may be solved by using a structure containing the first electrode arrays formed on one main surface of a transparent substrate and the second electrode arrays formed on the other main surface thereof.

However, this structure may cause the following problem in the future. Though the projected capacitive touch panel has currently been used mainly in small devices such as PDAs (personal digital assistants) and mobile phones, the touch panel is expected to be used in large devices such as personal computer displays. This is because a standard operating system (OS) for a personal computer has recently been made compliant with a multi-touch technology.

The electrodes used in the conventional projected capacitive touch panel are composed of ITO (indium tin oxide) and therefore have high resistance of several tens ohm/sq. Thus, when the touch panel is used in the large devices in the above future trend, the large-sized touch panel exhibits a low current transfer rate between the electrodes, and thereby exhibits a low response speed (a long time between finger contact and touch position detection).

In view of the above problems, an object of the present invention is to provide a conductive sheet and a conductive sheet using method, where the conductive sheet can have a low-resistance conductive pattern on a substrate, can exhibit an improved visibility, and can be suitably used in a projected capacitive touch panel or the like.

Another object of the present invention is to provide a touch panel that can have a low-resistance conductive pattern on a substrate, can exhibit an improved visibility, and can be suitably used as a large-sized projected capacitive touch panel or the like.

[1] A conductive sheet according to a first aspect of the present invention, comprising two or more conductive large lattices and a connection for electrically connecting the adjacent large lattices formed on a substrate, wherein the large lattices each contain a combination of two or more small lattices, the connection contains one or more medium lattices, and the pitch of the medium lattices is n times larger than that of the small lattices (in which n is a real number larger than 1).

[2] A conductive sheet according to the first aspect, wherein the two or more large lattices are arranged in one direction with the connection disposed therebetween.

[3] A conductive sheet according to the first aspect, wherein the two or more large lattices are arranged in a first direction with the connection disposed therebetween to form a conductive pattern, two or more of the conductive patterns are arranged in a second direction perpendicular to the first direction, and an electrically isolated insulation is disposed between the adjacent conductive patterns.

[4] A conductive sheet according to a second aspect of the present invention, comprising a substrate, wherein two or more conductive first large lattices and a first connection for electrically connecting the adjacent first large lattices are formed on one main surface of the substrate, two or more conductive second large lattices and a second connection for electrically connecting the adjacent second large lattices are formed on the other main surface of the substrate, the first and second large lattices each contain a combination of two or more small lattices, the first and second connections each contain one or more medium lattices, and the pitch of the medium lattices is n times larger than that of the small lattices (in which n is a real number larger than 1).

[5] A conductive sheet according to the second aspect, wherein the two or more first large lattices are arranged in a first direction with the first connection disposed therebetween to form a first conductive pattern, the two or more second large lattices are arranged in a second direction perpendicular to the first direction with the second connection disposed therebetween to form a second conductive pattern, two or more of the first conductive patterns are arranged in the second direction, two or more of the second conductive patterns are arranged in the first direction, an electrically isolated first insulation is disposed between the adjacent first conductive patterns, an electrically isolated second insulation is disposed between the adjacent second conductive patterns, the first and second connections are arranged facing each other with the substrate in between, and the first and second insulations are arranged facing each other with the substrate in between.

[6] A conductive sheet according to the second aspect, wherein the medium lattices have a shape similar to the small lattices.

[7] A conductive sheet according to the second aspect, wherein the small lattices have a polygonal shape.

[8] A conductive sheet according to the second aspect, wherein the small lattices have a square shape.

[9] A conductive sheet according to a third aspect of the present invention, comprising a substrate and a conductive part formed on one main surface of the substrate, wherein the conductive part contains two or more conductive patterns composed of a thin metal wire, the conductive patterns each extend in a first direction and are arranged in a second direction perpendicular to the first direction, the conductive patterns each contain two or more large lattices connected in series in the first direction, the large lattices each contain a combination of two or more small lattices, the thin metal wire has a line width of 1 to 15 μm, and the small lattices have a side length of 50 to 500 μm.

[10] A conductive sheet according to the third aspect, wherein the thin metal wire has a line width of 1 to 9 μm.

[11] A conductive sheet according to a fourth aspect of the present invention, comprising a substrate, a first conductive part formed on one main surface of the substrate, and a second conductive part formed on the other main surface of the substrate, wherein the first conductive part contains two or more first conductive patterns composed of a thin metal wire, the first conductive patterns each extend in a first direction and are arranged in a second direction perpendicular to the first direction, the second conductive part contains two or more second conductive patterns composed of a thin metal wire, the second conductive patterns each extend in the second direction and are arranged in the first direction, the first conductive patterns each contain two or more first large lattices connected in series in the first direction, the second conductive patterns each contain two or more second large lattices connected in series in the second direction, the first and second large lattices each contain a combination of two or more small lattices, the thin metal wire has a line width of 1 to 15 μm, and the small lattices have a side length of 50 to 500 μm.

[12] A conductive sheet according to the fourth aspect, wherein the thin metal wire has a line width of 1 to 9 μm.

[13] A conductive sheet according to the fourth aspect, wherein a projected distance between a straight line on a side of the first large lattice and a straight line on a side of the second large lattice is selected based on a size of the small lattice.

[14] A conductive sheet according to the fourth aspect, wherein the projected distance is 100 to 400 μm.

[15] A conductive sheet according to the fourth aspect, wherein the first conductive part further contains an electrically isolated first insulation between the first conductive patterns, the second conductive part further contains an electrically isolated second insulation between the second conductive patterns, the first and second conductive patterns are crossed to form an arrangement of a large number of lattices as viewed from above, the first and second insulations overlap with each other to form a combined pattern between the first and second conductive patterns, and the combined pattern contains an opening having the same size as two or more of the lattices arranged.

[16] A conductive sheet according to the fourth aspect, wherein the combined pattern contains an opening having the same size as two or more of the small lattices arranged.

[17] A conductive sheet according to the fourth aspect, wherein the adjacent first large lattices are electrically connected by a first connection, the adjacent second large lattices are electrically connected by a second connection, the first and second connections each contain one or more medium lattices, and the pitch of the medium lattices is n times larger than that of the small lattices (in which n is a real number larger than 1).

[18] A conductive sheet according to the fourth aspect, wherein the combined pattern contains an opening having the same size as the medium lattice.

[19] A conductive sheet according to the fourth aspect, wherein the combined pattern contains an opening having the same size as a plurality of the small lattices arranged in an approximately cross shape.

[20] A conductive sheet according to the fourth aspect, wherein a large number of needle-like lines extend from a continuous straight line to form a comb-like shape along a first side of the first large lattice, a continuous straight line is formed along a second side of the first large lattice facing the first side, a continuous straight line is formed along a third side of the second large lattice facing the first side of the first large lattice with the substrate in between, and a large number of needle-like lines extend from a continuous straight line to form a comb-like shape along a fourth side of the second large lattice facing the second side of the first large lattice with the substrate in between.

[21] A conductive sheet according to the fourth aspect, wherein the first conductive part further contains a plurality of first insulations containing a first auxiliary line composed of a thin metal wire between the first conductive patterns, the second conductive part further contains a plurality of second insulations containing a second auxiliary line composed of a thin metal wire between the second conductive patterns, the first and second conductive patterns are crossed as viewed from above, the first and second insulations overlap with each other to form a combined pattern between the first and second conductive patterns, and the combined pattern has the first and second auxiliary lines crossed which do not overlap with the first and second conductive patterns.

[22] A conductive sheet according the fourth aspect, wherein the first auxiliary line is a straight line separated from the first large lattices, and the second auxiliary line is a straight line separated from the second large lattices.

[23] A conductive sheet according to the fourth aspect, wherein the first and second auxiliary lines each have a length approximately equal to the side length of the small lattices (18).

[24] A conductive sheet according to the fourth aspect, wherein the small lattices have a square shape, and the combined pattern has the first and second auxiliary lines perpendicularly crossed which do not overlap with the first and second conductive patterns.

[25] A conductive sheet according to the fourth aspect, wherein the small lattices have a rhombic shape, and the combined pattern has the first and second auxiliary lines crossed at an angle approximately equal to the vertex angle of the rhombic shape of the small lattice, the first and second auxiliary lines forming the combined pattern which does not overlap with the first and second conductive patterns.

[26] A conductive sheet for a touch panel placed on a display panel of a display device according to a fifth aspect of the present invention, comprising a first conductive sheet and a second conductive sheet, wherein the first conductive sheet contains a first substrate and a first conductive part formed on a main surface of the first substrate, the second conductive sheet contains a second substrate and a second conductive part formed on a main surface of the second substrate, the first conductive sheet is stacked on the second conductive sheet, the first conductive part contains two or more first conductive patterns composed of a thin metal wire, first terminal wiring patterns each connected to an end of the first conductive pattern, and a plurality of first terminals each connected to the corresponding first terminal wiring pattern, the first conductive patterns each extend in a first direction and are arranged in a second direction perpendicular to the first direction, the first terminals are formed in the longitudinal center of a side of the first conductive sheet, the second conductive part contains two or more second conductive patterns, second terminal wiring patterns each connected to an end of the second conductive pattern, and a plurality of second terminals each connected to the corresponding second terminal wiring pattern, the second conductive patterns each extend in the second direction and are arranged in the first direction, and the second terminals are formed in the longitudinal center of a side of the second conductive sheet.

[27] A conductive sheet according to the fifth aspect, wherein an arrangement of a plurality of the first terminals is adjacent to an arrangement of a plurality of the second terminals in the first and second conductive sheets as viewed from above.

[28] A conductive sheet according to the fifth aspect, wherein the end of each of the first conductive patterns is connected to the corresponding first terminal wiring pattern by a first wire connection, the end of each of the second conductive patterns is connected to the corresponding second terminal wiring pattern by a second wire connection, a plurality of the first wire connections are arranged in a straight line along the second direction, and a plurality of the second wire connections are arranged in a straight line along the first direction.

[29] A method for using a conductive sheet according to a sixth aspect of the present invention, comprising using first and second conductive sheets, wherein the first conductive sheet comprises two or more conductive first large lattices and a first connection for electrically connecting the adjacent first large lattices, the first large lattices each contain a combination of two or more small lattices, the first connection contains one or more medium lattices, the pitch of the medium lattices being n times larger than that of the small lattices (in which n is a real number larger than 1), the second conductive sheet comprises two or more conductive second large lattices and a second connection for electrically connecting the adjacent second large lattices, the second large lattices each contain a combination of two or more small lattices, the second connection contains one or more medium lattices, the pitch of the medium lattices being n times larger than that of the small lattices (in which n is a real number larger than 1), the two or more first large lattices are arranged in a first direction with the first connection disposed therebetween to form a first conductive pattern in the first conductive sheet, the two or more second large lattices are arranged in a second direction perpendicular to the first direction with the second connection disposed therebetween to form a second conductive pattern in the second conductive sheet, and the first and second conductive sheets are combined, so that the first and second connections form in combination an arrangement of the small lattices.

[30] A method for using a conductive sheet according to a seventh aspect of the present invention, comprising using first and second conductive sheets, wherein the first conductive sheet comprises two or more first conductive patterns composed of a thin metal wire and an electrically isolated first insulation disposed between the first conductive patterns, the first conductive patterns each extend in a first direction and are arranged in a second direction perpendicular to the first direction, the second conductive sheet comprises two or more second conductive patterns composed of a thin metal wire and an electrically isolated second insulation disposed between the second conductive patterns, the second conductive patterns each extend in the second direction and are arranged in the first direction, and the first and second conductive sheets are combined, so that the first and second conductive patterns are crossed to form an arrangement of a large number of lattices, and the first and second insulations overlap with each other to form an opening having the same size as two or more of the lattices between the first and second conductive patterns.

[31] A method for using a conductive sheet according to an eighth aspect of the present invention, comprising using first and second conductive sheets, wherein the first conductive sheet comprises two or more first conductive patterns composed of a thin metal wire and a plurality of first insulations arranged between the first conductive patterns, the first conductive patterns each extend in a first direction and are arranged in a second direction perpendicular to the first direction, the first insulations each contains a first auxiliary line composed of a thin metal wire, the second conductive sheet comprises two or more second conductive patterns composed of a thin metal wire and a plurality of second insulations arranged between the second conductive patterns, the second conductive patterns each extend in the second direction and are arranged in the first direction, the second insulations each contains a second auxiliary line composed of a thin metal wire, the first and second conductive sheets are combined, so that the first and second conductive patterns are crossed to form an arrangement of a large number of lattices, the first and second insulations overlap with each other between the first and second conductive patterns, and the first and second auxiliary lines are crossed and do not overlap with the first and second conductive patterns.

[32] A capacitive touch panel according to a ninth aspect of the present invention, comprising a conductive sheet according to any one of the first to fifth aspects.

As described above, in the conductive sheet and the conductive sheet using method of the present invention, the resistance of the conductive pattern formed on the substrate can be lowered, the visibility can be improved, and the conductive sheet can be suitably used in a projected capacitive touch panel or the like.

Furthermore, in the touch panel of the present invention, the resistance of the conductive pattern formed on the substrate can be lowered, the visibility can be improved, and the touch panel can be suitably used as a large-sized projected capacitive touch panel or the like.

DESCRIPTION OF EMBODIMENTS

Several embodiments of the conductive sheet, the conductive sheet using method, and the touch panel of the present invention will be described below with reference to FIGS. 1 to 23. It should be noted that, in this description, a numeric range of "A to B" includes both the numeric values A and B as the lower limit and upper limit values.

Figure 1:
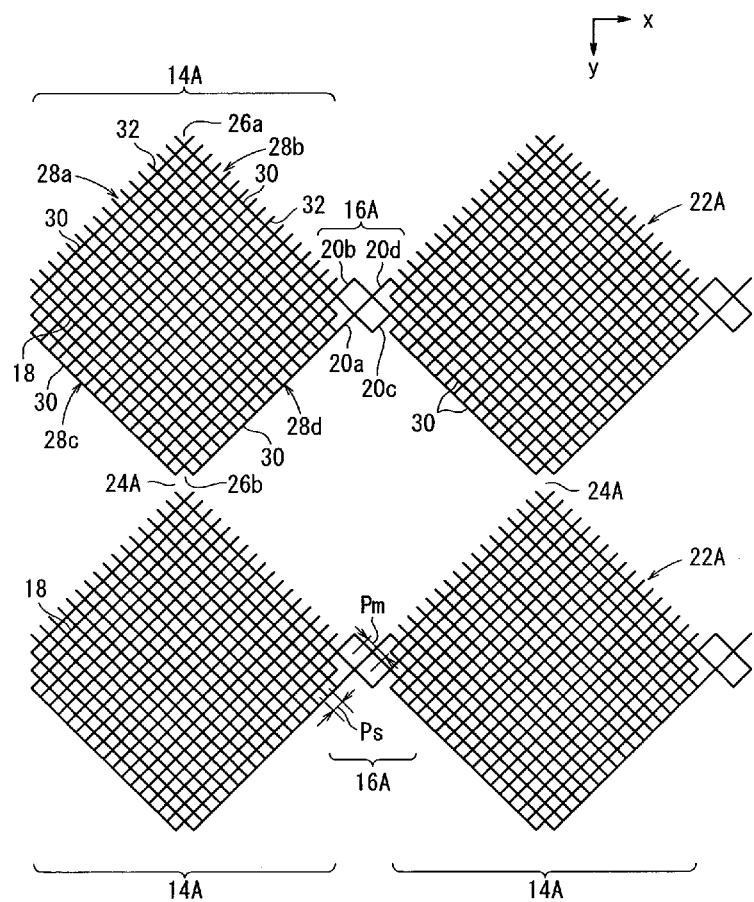
FIG. 1 is a plan view showing an example of a first conductive pattern formed on a first conductive sheet.
Figure 2:
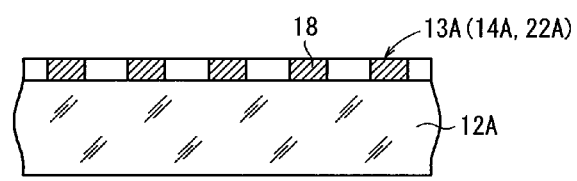
FIG. 2 is a cross-sectional view partially showing the first conductive sheet.

As shown in FIG. 1, a conductive sheet according to a first embodiment (hereinafter referred to as the first conductive sheet 10A) has a first conductive part 13A formed on one main surface of a first transparent substrate 12A shown in FIG. 2. The first conductive part 13A contains two or more conductive first large lattices 14A composed of a thin metal wire and further contains first connections 16A composed of a thin metal wire. Each adjacent two of the first large lattices 14A are electrically connected by the first connection 16A. The first large lattices 14A each contain a combination of two or more small lattices 18, the first connections 16A each contain one or more medium lattices 20 (20a to 20d), and the pitch of the medium lattices 20 is n times larger than that of the small lattices 18 (in which n is a real number larger than 1). The small lattices 18 have a smallest square shape. For example, the thin metal wire contains gold (Au), silver (Ag), or copper (Cu).

The side length of the first large lattice 14A is preferably 3 to 10 mm, more preferably 4 to 6 mm. When the side length is less than the lower limit, the electrostatic capacitance of the first large lattice 14A is lowered, and a touch panel or the like using the first conductive sheet 10A is likely to cause a detection problem. On the other hand, when the side length is more than the upper limit, the position detection accuracy may be deteriorated. The side length of the small lattice 18 in the first large lattice 14A is preferably 50 to 500 μm, more preferably 150 to 300 μm, for the same reasons. When the side length of the small lattice 18 is within this range, the first conductive sheet 10A has high transparency and thereby can be suitably used on the front surface of a display device with excellent visibility.

The two or more first large lattices 14A are arranged in an x direction (a first direction) with the first connections 16A disposed therebetween, to form a first conductive pattern 22A composed of the thin metal wire. Two or more of the first conductive patterns 22A are arranged in a y direction (a second direction) perpendicular to the x direction. Electrically isolated first insulations 24A are disposed between the adjacent first conductive patterns 22A.

For example, the x direction corresponds to the horizontal or vertical direction of a projected capacitive touch panel 100 or a display panel 110 equipped with the touch panel 100 to be hereinafter described (see FIG. 3).

As shown in FIG. 1, among four sides of the first large lattice 14A, a first side 28a and a second side 28b are on one corner 26a not connected to the adjacent first large lattice 14A. A continuous straight line 30 is formed along each of the first side 28a and the second side 28b, and a large number of needle-like lines 32 (sides of the small lattices 18) extend from the straight line 30 to form a comb-like shape. Furthermore, a third side 28c and a fourth side 28d are on the other corner 26b not connected to the adjacent first large lattice 14A. A continuous straight line 30 is formed along each of the third side 28c and the fourth side 28d, and one small lattice 18 is removed (more specifically adjacent two sides are removed) in the other corner 26b.

In the first connection 16A, the four medium lattices 20 (the first medium lattice 20a to the fourth medium lattice 20d) are arranged in a zigzag manner, and each of the medium lattices 20 has a size equal to the total size of four small lattices 18. The first medium lattice 20a is disposed at the boundary between the straight lines 30 along the second side 28b and the fourth side 28d, and forms an L-shaped space in combination with one small lattice 18. The second medium lattice 20b is disposed on one side of the first medium lattice 20a (the straight line 30 along the second side 28b), and forms a square space. Thus, the shape of the second medium lattice 20b is such that four small lattices 18 are arranged in a matrix and the central cross is removed. The third medium lattice 20c is adjacent to the first medium lattice 20a and the second medium lattice 20b, and has the same shape as the second medium lattice 20b. The fourth medium lattice 20d is disposed at the boundary between the first side 28a and the second straight line 30 along the third side 28c (the second straight line 30 from the outside to the inside of the first large lattice 14A), is adjacent to the second medium lattice 20b and the third medium lattice 20c, and forms an L-shaped space in combination with one small lattice 18 as well as the first medium lattice 20a. One side of the fourth medium lattice 20d is disposed on an extended line of the straight line 30 along the fourth side 28d of the first large lattice 14A. When the small lattices 18 have an arrangement pitch Ps, and the medium lattices 20 have an arrangement pitch Pm of 2×Ps.

In one end of each first conductive pattern 22A, the first connection 16A is not formed on the open end of the first large lattice 14A. In the other end of the first conductive pattern 22A, the end of the first large lattice 14A is electrically connected to a first terminal wiring pattern 41a composed of a thin metal wire by a first wire connection 40a (see FIG. 4).

As described above, in the first conductive sheet 10A, the two or more first large lattices 14A are arranged in the x direction with the first connections 16A disposed therebetween to form one first conductive pattern 22A, the two or more small lattices 18 are combined to form each first large lattice 14A, the four medium lattices 20 are arranged to form each first connection 16A, and the pitch of the medium lattices 20 is 2 times larger than that of the small lattices 18. As a result, the first conductive sheet 10A can exhibit a significantly lowered electrical resistance as compared with conventional structures using one ITO film for one electrode. Thus, when the first conductive sheet 10A is used in a projected capacitive touch panel or the like, the response speed and the size of the touch panel can be easily increased.

A touch panel 100 containing the above first conductive sheet 10A will be described below with reference to FIGS. 3 to 7.

Figure 4:
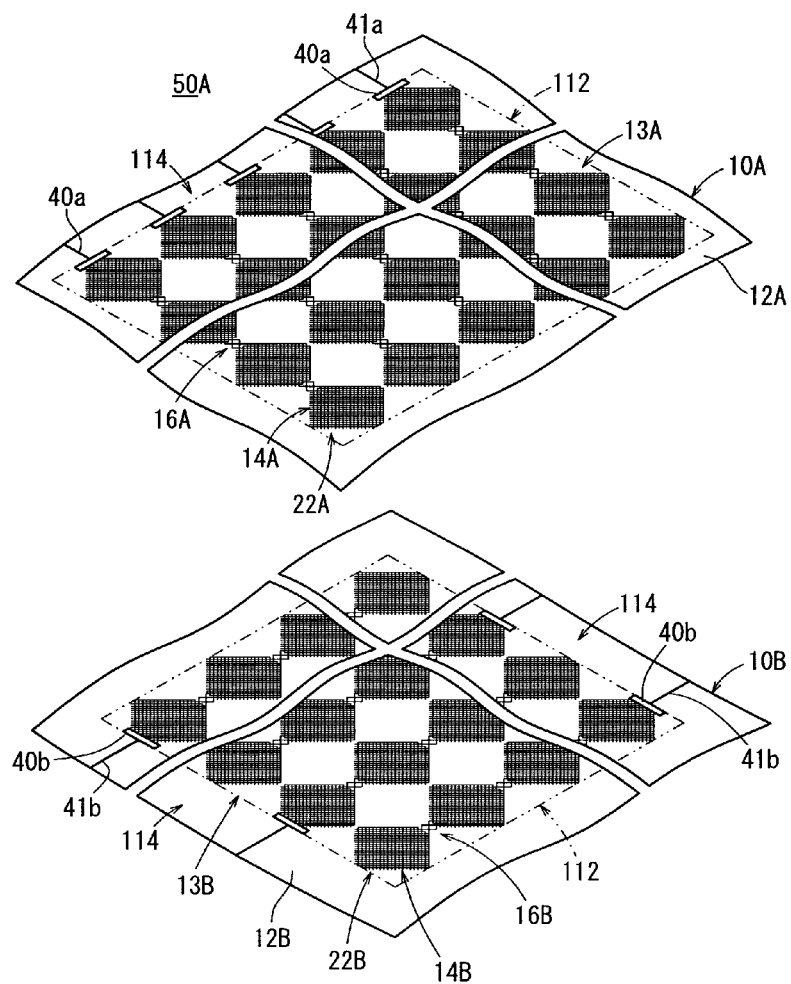
FIG. 4 is an exploded perspective view partially showing a first laminated conductive sheet.
Figure 5A:
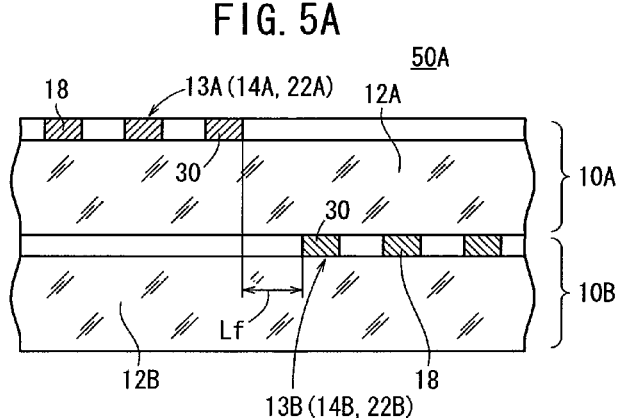
FIG. 5A is a cross-sectional view partially showing an example of the first laminated conductive sheet.

The touch panel 100 has a sensor body 102 and a control circuit such as an integrated circuit (not shown). As shown in FIGS. 3, 4, and 5A, the sensor body 102 contains a touch panel conductive sheet according to the first embodiment (hereinafter referred to as the first laminated conductive sheet 50A) and thereon a protective layer 106 (not shown in FIG. 5A). The first laminated conductive sheet 50A is obtained by stacking the above first conductive sheet 10A and a second conductive sheet 10B to be hereinafter described. The first laminated conductive sheet 50A and the protective layer 106 are disposed on a display panel 110 of a display device 108 such as a liquid crystal display. As viewed from above, the sensor body 102 has a sensing region 112 corresponding to a display screen 110a of the display panel 110 and a terminal wiring region 114 (a so-called frame) corresponding to the periphery of the display panel 110.

As shown in FIG. 4, in the first conductive sheet 10A used in the touch panel 100, the above plural first conductive patterns 22A are arranged in the sensing region 112, and the plural first terminal wiring patterns 41a composed of the thin metal wire extend from the first wire connections 40a in the terminal wiring region 114.

Figure 3:
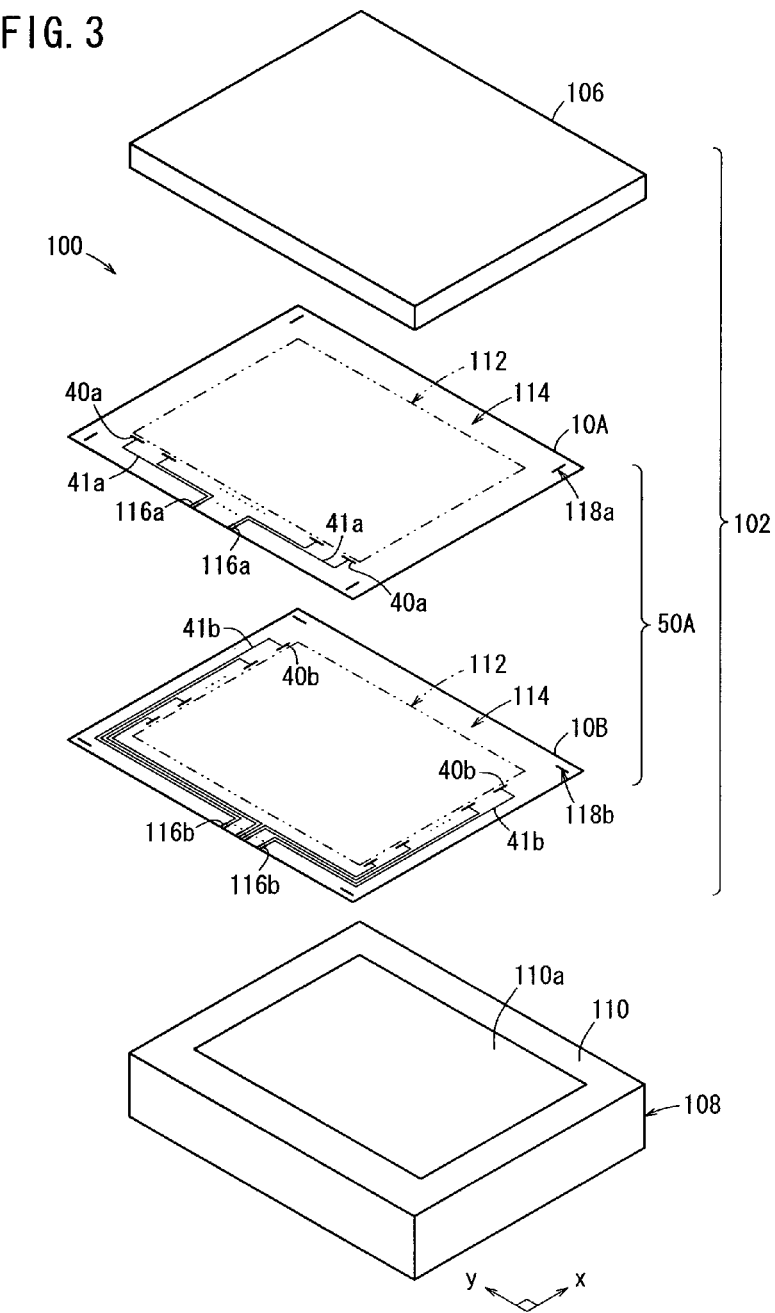
FIG. 3 is an exploded perspective view showing a structure of a touch panel.

In the example of FIG. 3, the first conductive sheet 10A and the sensing region 112 each have a rectangle shape as viewed from above. In the terminal wiring region 114, a plurality of first terminals 116a are arranged in the longitudinal center in the length direction of the periphery on one longer side of the first conductive sheet 10A. The plural first wire connections 40a are arranged in a straight line in the y direction along one longer side of the sensing region 112 (a longer side closest to the one longer side of the first conductive sheet 10A). The first terminal wiring pattern 41a lead from each first wire connection 40a is drawn to the center of the one longer side of the first conductive sheet 10A, and is electrically connected to the corresponding first terminal 116a. Thus, the first terminal wiring patterns 41a, connected to each pair of corresponding first wire connections formed on the right and left of the one longer side of the sensing region, have approximately the same lengths. Of course, the first terminals 116a may be formed in a corner of the first conductive sheet 10A or the vicinity thereof. However, in this case, the length difference between the longest first terminal wiring pattern 41a and the shortest first terminal wiring pattern 41a is increased, whereby the longest first terminal wiring pattern 41a and the first terminal wiring patterns 41a in the vicinity thereof are disadvantageously poor in the rate of transferring a signal to the corresponding first conductive pattern 22A. Thus, in this embodiment, the first terminals 116a are formed in the longitudinal center of the one longer side of the first conductive sheet 10A, whereby the local signal transfer rate deterioration is prevented, resulting in increase in the response speed.

Figure 6:
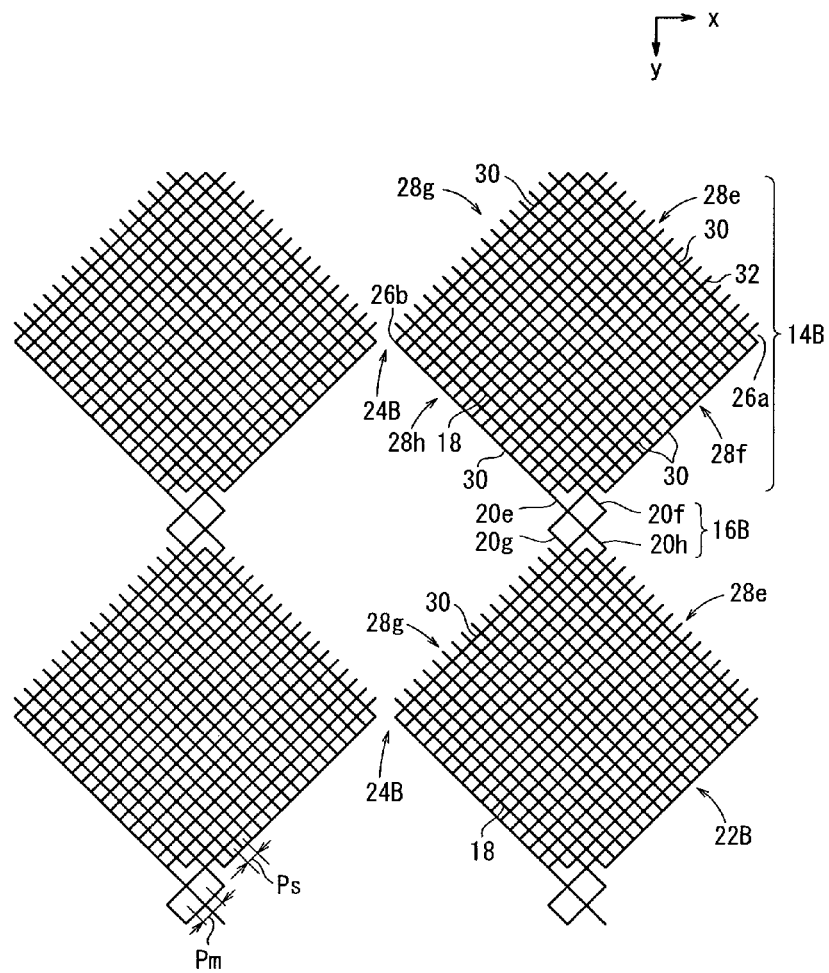
FIG. 6 is a plan view showing an example of a second conductive pattern formed on a second conductive sheet.

As shown in FIGS. 3, 4, and 5A, the second conductive sheet 10B has a second conductive part 13B formed on one main surface of a second transparent substrate 12B. The second conductive part 13B contains two or more conductive second large lattices 14B composed of a thin metal wire and further contains second connections 16B composed of a thin metal wire. Each adjacent two of the second large lattices 14B are electrically connected by the second connection 16B. As shown in FIG. 6, the second large lattices 14B each contain a combination of two or more small lattices 18, the second connections 16B each contain one or more medium lattices 20, and the pitch of the medium lattices 20 is n times larger than that of the small lattices 18 (in which n is a real number larger than 1). The side length of the second large lattice 14B is preferably 3 to 10 mm, more preferably 4 to 6 mm, as well as the first large lattice 14A.

The two or more second large lattices 14B are arranged in the y direction (the second direction) with the second connections 16B disposed therebetween, to form one second conductive pattern 22B composed of the thin metal wire. Two or more of the second conductive patterns 22B are arranged in the x direction (the first direction) perpendicular to the y direction. Electrically isolated second insulations 24B are disposed between the adjacent second conductive patterns 22B.

As shown in FIG. 4, for example, in one end of each alternate odd-numbered second conductive pattern 22B and in the other end of each even-numbered second conductive pattern 22B, the second connection 16B is not formed on the open end of the second large lattice 14B. In the other end of each odd-numbered second conductive pattern 22B and in one end of each even-numbered second conductive pattern 22B, the end of the second large lattice 14B is electrically connected to a second terminal wiring pattern 41b composed of a thin metal wire by a second wire connection 40b.

The plural second conductive patterns 22B are arranged in the sensing region 112, the plural second terminal wiring patterns 41b being lead from the second wire connections 40b in the terminal wiring region 114.

As shown in FIG. 3, in the terminal wiring region 114, a plurality of second terminals 116b are arranged in the longitudinal center in the length direction of the periphery on one longer side of the second conductive sheet 10B. For example, the plural odd-numbered second wire connections 40b are arranged in a straight line in the x direction along one shorter side of the sensing region 112 (a shorter side closest to one shorter side of the second conductive sheet 10B), and the plural even-numbered second wire connections 40b are arranged in a straight line in the x direction along the other shorter side of the sensing region 112 (a shorter side closest to the other shorter side of the second conductive sheet 10B).

For example, each odd-numbered second conductive pattern 22B is connected to the corresponding odd-numbered second wire connection 40b, and each even-numbered second conductive pattern 22B is connected to the corresponding even-numbered second wire connection 40b. The second terminal wiring patterns 41b lead from the odd-numbered and even-numbered second wire connections 40b to the center of one longer side of the second conductive sheet 10B, and are electrically connected to the corresponding second terminals 116b. Thus, for example, the first and second ones of the second terminal wiring patterns 41b have approximately the same lengths, and similarly the (2n−1)-th and (2n)-th second terminal wiring patterns 41b have approximately the same lengths (n=1, 2, 3, . . . ).

Of course, the second terminals 116b may be formed in a corner of the second conductive sheet 10B or the vicinity thereof. However, in this case, as described above, the longest second terminal wiring pattern 41b and the second terminal wiring patterns 41b in the vicinity thereof are disadvantageously poor in the rate of transferring a signal to the corresponding second conductive pattern 22B. Thus, in this embodiment, the second terminals 116b are formed in the longitudinal center of the one longer side of the second conductive sheet 10B, whereby the local signal transfer rate deterioration is prevented, resulting in increase in the response speed.

The first terminal wiring patterns 41a may be arranged in the same manner as the above second terminal wiring patterns 41b, and the second terminal wiring patterns 41b may be arranged in the same manner as the above first terminal wiring patterns 41a.

When the first laminated conductive sheet 50A is used in a touch panel, a protective layer is formed on the first conductive sheet 10A, and the first terminal wiring patterns 41a lead from the plural first conductive patterns 22A in the first conductive sheet 10A and the second terminal wiring patterns 41b lead from the plural second conductive patterns 22B in the second conductive sheet 10B are connected to a scan control circuit or the like.

A self or mutual capacitance technology can be preferably used for detecting a touch position. In the self capacitance technology, a voltage signal for the touch position detection is sequentially supplied to the first conductive patterns 22A, and further a voltage signal for the touch position detection is sequentially supplied to the second conductive patterns 22B. When a finger comes into contact with or close to the upper surface of the protective layer 106, the capacitance between the first conductive pattern 22A and the second conductive pattern 22B in the touch position and the GND (ground) is increased, whereby signals from this first conductive pattern 22A and this second conductive pattern 22B have a waveform different from those of signals from the other conductive patterns. Thus, the touch position is calculated by a control circuit based on the signals transmitted from the first conductive pattern 22A and the second conductive pattern 22B. On the other hand, in the mutual capacitance technology, for example, a voltage signal for the touch position detection is sequentially supplied to the first conductive patterns 22A, and the second conductive patterns 22B are sequentially subjected to sensing (transmitted signal detection). When a finger comes into contact with or close to the upper surface of the protective layer 106, the parallel stray capacitance of the finger is added to the parasitic capacitance between the first conductive pattern 22A and the second conductive pattern 22B in the touch position, whereby a signal from this second conductive pattern 22B has a waveform different from those of signals from the other second conductive patterns 22B. Thus, the touch position is calculated by a control circuit based on the order of the first conductive patterns 22A supplied with the voltage signal and the signal transmitted from the second conductive pattern 22B. Even when two fingers come into contact with or close to the upper surface of the protective layer 106 simultaneously, the touch positions can be detected by using the self or mutual capacitance technology selected. Conventional related detection circuits used in projected capacitive technologies are described in U.S. Pat. Nos. 4,582,955, 4,686,332, 4,733,222, 5,374,787, 5,543,588, and 7,030,860, US Patent Application Publication No. 2004/0155871, etc.

As shown in FIG. 6, among four sides of the second large lattice 14B in the second conductive pattern 22B, a fifth side 28e and a sixth side 28f are on one corner 26a not connected to the adjacent second large lattice 14B. The fifth side 28e is similar to the first side 28a of the first large lattice 14A in the first conductive sheet 10A, a continuous straight line 30 is formed along the fifth side 28e, and a large number of needle-like lines 32 (sides of the small lattices 18) extend from the straight line 30 to form a comb-like shape. The sixth side 28f is similar to the third side 28c of the first large lattice 14A in the first conductive sheet 10A, and a continuous straight line 30 is formed along the sixth side 28f. Furthermore, a seventh side 28g and an eighth side 28h are on the other corner 26b not connected to the adjacent second large lattice 14B. The seventh side 28g is similar to the fifth side 28e, a continuous straight line 30 is formed along the seventh side 28g, and a large number of needle-like lines 32 (sides of the small lattices 18) extend from the straight line 30 to form a comb-like shape. The eighth side 28h is similar to the sixth side 28f, and a continuous straight line 30 is formed along the eighth side 28h.

In the second connection 16B, the four medium lattices 20 (the fifth medium lattice 20e to the eighth medium lattice 20h) are arranged in a zigzag manner, and each of the medium lattices 20 has a size equal to the total size of four small lattices 18. The fifth medium lattice 20e is disposed at the boundary between the second straight line 30 along the sixth side 28f (the second straight line 30 from the outside to the inside of the second large lattice 14B) and the straight line 30 along the eighth side 28h, and forms an L-shaped space in combination with one small lattice 18. The sixth medium lattice 20f is disposed on one side of the fifth medium lattice 20e (the second straight line 30 along the sixth side 28f), and forms a square space. Thus, the shape of the sixth medium lattice 20f is such that four small lattices 18 are arranged in a matrix and the central cross is removed. The seventh medium lattice 20g is adjacent to the fifth medium lattice 20e and the sixth medium lattice 20f, and has the same shape as the sixth medium lattice 20f. The eighth medium lattice 20h is disposed at the boundary between the fifth side 28e and the straight line 30 along the seventh side 28g, is adjacent to the sixth medium lattice 20f and the seventh medium lattice 20g, and forms an L-shaped space in combination with one small lattice 18 as the fifth medium lattice 20e. One side of the eighth medium lattice 20h is disposed on an extended line of the straight line 30 along the eighth side 28h in the fifth medium lattice 20e. Also in the second conductive sheet 10B, when the small lattices 18 have an arrangement pitch Ps, the medium lattices 20 have an arrangement pitch Pm of 2×Ps.

Figure 7:
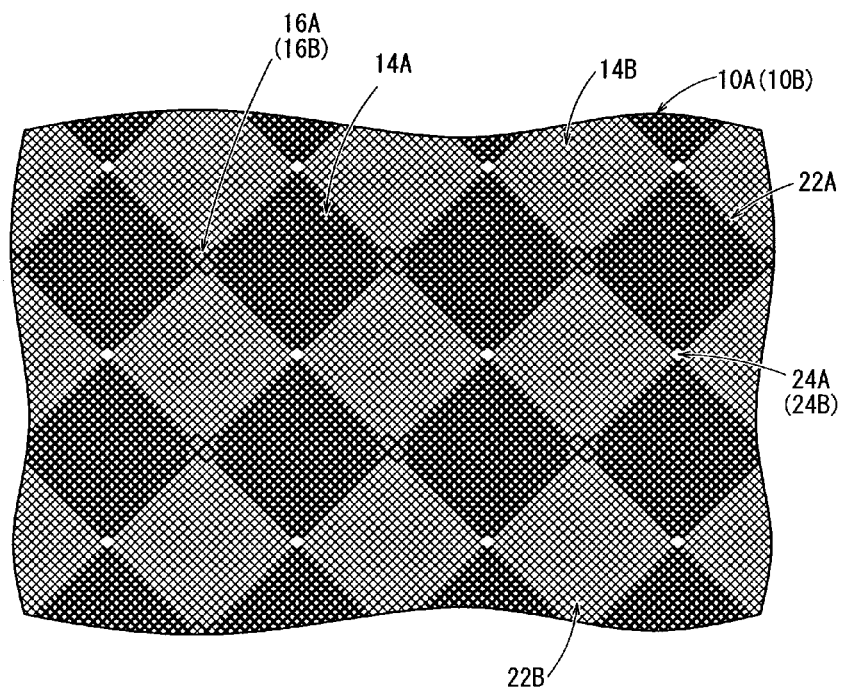
FIG. 7 is a plan view partially showing an example of the first laminated conductive sheet obtained by combining the first and second conductive sheets.

For example, as shown in FIG. 7, when the first conductive sheet 10A is stacked on the second conductive sheet 10B to form the first laminated conductive sheet 50A, the first connections 16A of the first conductive patterns 22A and the second connections 16B of the second conductive patterns 22B are arranged facing each other with the first transparent substrate 12A (see FIG. 5A) in between. Also, the first insulations 24A between the first conductive patterns 22A and the second insulations 24B between the second conductive patterns 22B are arranged facing each other with the first transparent substrate 12A in between. Though the first conductive patterns 22A and the second conductive patterns 22B are exaggeratingly shown by thick lines and thin lines respectively to clearly represent the positions thereof in FIG. 7, they have the same line width.

When the stacked first conductive sheet 10A and second conductive sheet 10B are observed from above, the spaces between the first large lattices 14A of the first conductive sheet 10A are filled with the second large lattices 14B of the second conductive sheet 10B. Thus, the surface is covered with the large lattices. In this observation, the ends of the comb teeth 32 on the first sides 28a and the second sides 28b of the first large lattices 14A are connected to the straight lines 30 along the sixth sides 28f and the eighth sides 28h of the second large lattices 14B, so that the small lattices 18 are arranged over the stack. Similarly, the ends of the comb teeth 32 on the fifth sides 28e and the seventh sides 28g of the second large lattices 14B are connected to the straight lines 30 along the third sides 28c and the fourth sides 28d of the first large lattices 14A, so that the small lattices 18 are arranged over the stack. As a result, the boundaries between the first large lattices 14A and the second large lattices 14B cannot be easily found.

For example, in a case where all the sides of the first large lattices 14A and the second large lattices 14B are formed in the shapes of the straight lines 30 (i.e., where the open ends of the lines 32 extending from the first side 28a and the second side 28b of each first large lattice 14A are connected to form straight lines 30, and also the open ends of the lines 32 extending from the fifth side 28e and the seventh side 28g of each second large lattice 14B are connected to form straight lines 30), the overlaps of the straight lines 30 have large widths (the lines are thickened) due to slight deterioration of stack position accuracy, whereby the boundaries between the first large lattices 14A and the second large lattices 14B are highly visible, deteriorating the visibility disadvantageously. In contrast, in this embodiment, the ends of the comb teeth 32 overlap with the straight line 30 as described above, whereby the boundaries between the first large lattices 14A and the second large lattices 14B are made less visible to improve the visibility. Though an opening having a size equal to one medium lattice is formed in each overlap of the first insulation 24A and the second insulation 24B, the opening does not block a light and is less visible unlike the above thickened line. Particularly when the opening has the same size as the medium lattice, the opening is not significantly larger than the surrounding small lattices 18, and thereby is less visible.

Furthermore, in the case where all the first sides 28a to the eighth sides 28h of the first large lattices 14A and the second large lattices 14B are formed in the shapes of the straight lines 30, the straight lines 30 along the fifth sides 28e to the eighth sides 28h of the second large lattices 14B are positioned right under the straight lines 30 along the first sides 28a to the fourth sides 28d of the first large lattices 14A. In this case, the straight lines 30 function as conductive portions, parasitic capacitances are formed between the sides of the first large lattices 14A and the sides of the second large lattices 14B, and the parasitic capacitances act as noises on charge information, significantly deteriorating the S/N ratio. Furthermore, since the parasitic capacitances are formed between the first large lattice 14A and the second large lattice 14B, a large number of the parasitic capacitances are connected in parallel in the first conductive patterns 22A and the second conductive patterns 22B to increase the CR time constant disadvantageously. When the CR time constant is increased, there is a possibility that the waveform rise time of the voltage signal supplied to the first conductive pattern 22A (and the second conductive pattern 22B) is increased, and an electric field for the position detection is hardly generated in a predetermined scan time. In addition, there is a possibility that the waveform rise or fall time of the signal transmitted from each of the first conductive patterns 22A and the second conductive patterns 22B is increased, and the waveform change of the transmitted signal cannot be detected in a predetermined scan time. This leads to detection accuracy deterioration and response speed deterioration. Thus, in this case, the detection accuracy and the response speed can be improved only by reducing the number of the first large lattices 14A and the second large lattices 14B (lowering the resolution) or by reducing the size of the display screen, and the laminated conductive sheet cannot be used in a large screen such as a B5 sized, A4 sized, or larger screen.

In contrast, in this embodiment, as shown in FIG. 5A, the projected distance Lf between the straight line 30 along a side of the first large lattice 14A and the straight line 30 along a side of the second large lattice 14B is approximately equal to the side length of the small lattice 18 (50 to 500 µm). Furthermore, only the ends of the needle-like lines 32 extending from the first side 28a and the second side 28b of the first large lattice 14A overlap with the straight lines 30 along the sixth side 28f and the eighth side 28h of the second large lattice 14B, and only the ends of the needle-like lines 32 extending from the fifth side 28e and the seventh side 28g of the second large lattice 14B overlap with the straight lines 30 along the third side 28c and the fourth side 28d of the first large lattice 14A. Therefore, only a small parasitic capacitance is formed between the first large lattice 14A and the second large lattice 14B. As a result, the CR time constant can be reduced to improve the detection accuracy and the response speed.

It is preferred that the optimum value of the projected distance Lf is appropriately selected depending not on the sizes of the first large lattices 14A and the second large lattices 14B but on the sizes (the line widths and the side lengths) of the small lattices 18. When the small lattices 18 have an excessively large size in view of the sizes of the first large lattices 14A and the second large lattices 14B, the first laminated conductive sheet 50A may have a high light transmittance, but the dynamic range of the transmitted signal may be reduced to lower the detection sensitivity. On the other hand, when the small lattices 18 have an excessively small size, the first laminated conductive sheet 50A may have a high detection sensitivity, but the light transmittance may be deteriorated under the restriction of line width reduction.

When the small lattices 18 have a line width of 1 to 9 µm, the optimum value of the projected distance Lf (the optimum distance) is preferably 100 to 400 µm, more preferably 200 to 300 µm. In a case where the small lattices 18 have a smaller line width, the optimum distance can be further reduced. However, in this case, the electrical resistance may be increased, and the CR time constant may be increased even under a small parasitic capacitance, deteriorating the detection sensitivity and the response speed. Thus, the line width of the small lattice 18 is preferably within the above range.

For example, the sizes of the first large lattices 14A, the second large lattices 14B, and the small lattices 18 are determined based on the size of the display panel 110 or the size and touch position detection resolution (drive pulse period) of the sensing region 112, and the optimum distance between the first large lattice 14A and the second large lattice 14B is obtained based on the line width of the small lattices 18.

When the overlaps of the first connections 16A and the second connections 16B are observed from above, the connection point of the fifth medium lattice 20e and the seventh medium lattice 20g in the second connection 16B is positioned approximately at the center of the second medium lattice 20b in the first connection 16A, the connection point of the sixth medium lattice 20f and the eighth medium lattice 20h in the second connection 16B is positioned approximately at the center of the third medium lattice 20c in the first connection 16A, and the first medium lattices 20a to the eighth medium lattices 20h form a plurality of the small lattices 18 in combination. Therefore, the plural small lattices 18 are formed by the combination of the first connections 16A and the second connections 16B in the overlaps. Thus formed small lattices 18 cannot be distinguished from the surrounding small lattices 18 in the first large lattices 14A and the second large lattices 14B, so that the visibility is improved.

In this embodiment, in the terminal wiring region 114, the plural first terminals 116a are formed in the longitudinal center of the periphery on the one longer side of the first conductive sheet 10A, and the plural second terminals 116b are formed in the longitudinal center of the periphery on the one longer side of the second conductive sheet 10B. Particularly, in the example of FIG. 3, the first terminals 116a and the second terminals 116b are close to each other and do not overlap with each other, and the first terminal wiring patterns 41a and the second terminal wiring patterns 41b do not overlap with each other. For example, the first terminal 116a may partially overlap with the odd-numbered second terminal wiring pattern 41b.

Thus, the plural first terminals 116a and the plural second terminals 116b can be electrically connected to the control circuit by using a cable and two connectors (a connector for the first terminals 116a and a connector for the second terminals 116b) or one connector (a complex connector for the first terminals 116a and the second terminals 116b).

Since the first terminal wiring patterns 41a and the second terminal wiring patterns 41b do not vertically overlap with each other, a parasitic capacitance is reduced therebetween to prevent the response speed deterioration.

Since the first wire connections 40a are arranged along the one longer side of the sensing region 112 and the second wire connections 40b are arranged along the both shorter sides of the sensing region 112, the area of the terminal wiring region 114 can be reduced. Therefore, the size of the display panel 110 containing the touch panel 100 can be easily reduced, and the display screen 110a can be made to seem larger. Also the operability of the touch panel 100 as a touch sensor can be improved.

The area of the terminal wiring region 114 may be further reduced by reducing the distance between the adjacent first terminal wiring patterns 41a or the adjacent second terminal wiring patterns 41b. The distance is preferably 10 to 50 μm in view of preventing migration.

Alternatively, the area of the terminal wiring region 114 may be reduced by arranging the second terminal wiring pattern 41b between the adjacent first terminal wiring patterns 41a in the view from above. However, when the pattern is misarranged, the first terminal wiring pattern 41a may vertically overlap with the second terminal wiring pattern 41b to increase the parasitic capacitance therebetween. This leads to deterioration of the response speed. Thus, in the case of using such an arrangement, the distance between the adjacent first terminal wiring patterns 41a is preferably 50 to 100 μm.

As described above, when the first laminated conductive sheet 50A is used in a projected capacitive touch panel or the like, the response speed and the size of the touch panel can be easily increased. Furthermore, the boundaries between the first large lattices 14A of the first conductive sheet 10A and the second large lattices 14B of the second conductive sheet 10B are less visible, and the first connections 16A and the second connections 16B form the plural small lattices 18 in combination, so that defects such as local line thickening can be prevented, and the overall visibility can be improved.

Furthermore, the CR time constant of the first conductive patterns 22A and the second conductive patterns 22B can be significantly reduced, whereby the response speed can be increased, and the position detection can be readily carried out in an operation time (a scan time). Thus, the screen sizes (not the thickness but the length and width) of the touch panel 100 can be easily increased.

Figure 5B:
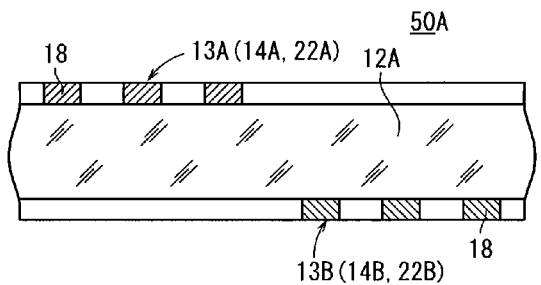
FIG. 5B is a cross-sectional view partially showing another example of the first laminated conductive sheet.

As shown in FIGS. 4 and 5A, in the above first laminated conductive sheet 50A, the first conductive patterns 22A are formed on the one main surface of the first transparent substrate 12A, and the second conductive patterns 22B are formed on the one main surface of the second transparent substrate 12B. Alternatively, as shown in FIG. 5B, the structure of the first laminated conductive sheet 50A may be such that the first conductive patterns 22A are formed on one main surface of the first transparent substrate 12A and the second conductive patterns 22B are formed on the other main surface of the first transparent substrate 12A. In this case, the second transparent substrate 12B is not used, the first transparent substrate 12A is stacked on the second conductive part 13B, and the first conductive part 13A is stacked on the first transparent substrate 12A. In addition, another layer may be formed between the first conductive sheet 10A and the second conductive sheet 10B. The first conductive pattern 22A and the second conductive pattern 22B may be arranged facing each other as long as they are insulated.

As shown in FIG. 3, first alignment marks 118a and second alignment marks 118b are preferably formed on the corners etc. of the first conductive sheet 10A and the second conductive sheet 10B. The first alignment marks 118a and the second alignment marks 118b are used for positioning the sheets in the process of bonding the sheets. When the first conductive sheet 10A and the second conductive sheet 10B are bonded to obtain the first laminated conductive sheet 50A, the first alignment marks 118a and the second alignment marks 118b form composite alignment marks. The composite alignment marks are used for positioning in the process of attaching the first laminated conductive sheet 50A to the display panel 110.

A touch panel conductive sheet according to a second embodiment (hereinafter referred to as the second laminated conductive sheet 50B) will be described below with reference to FIGS. 8 to 11.

Figure 8:
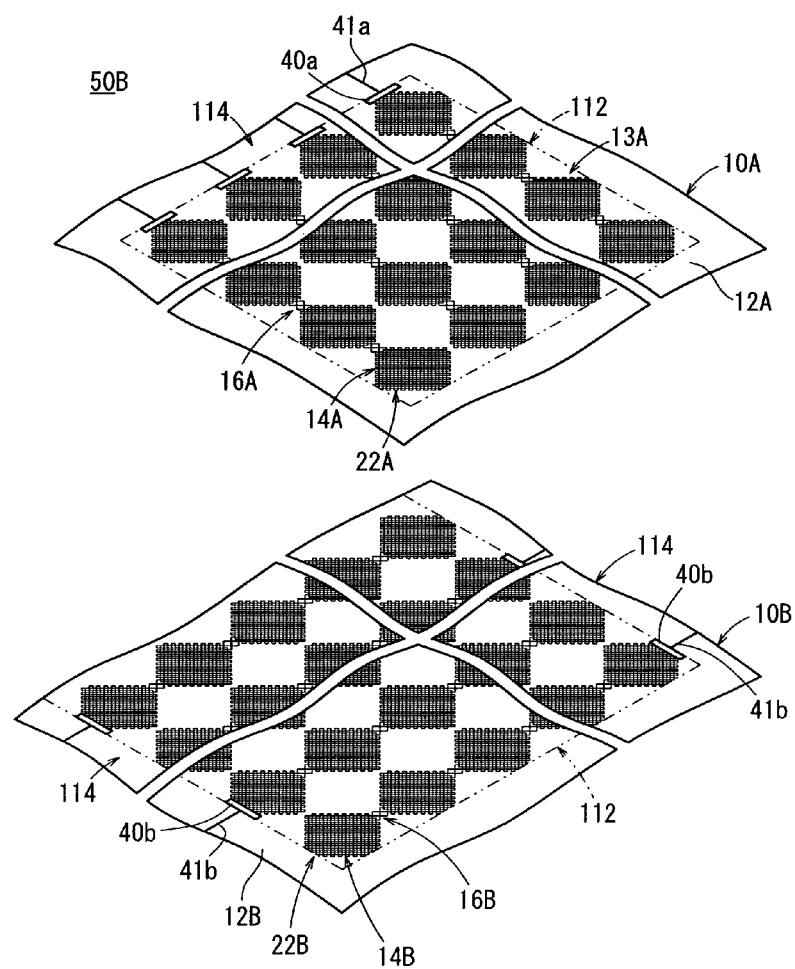
FIG. 8 is an exploded perspective view partially showing a second laminated conductive sheet.

As shown in FIG. 8, the second laminated conductive sheet 50B has approximately the same structure as the above first laminated conductive sheet 50A. The second laminated conductive sheet 50B is different from the first laminated conductive sheet 50A in that two or more rectangles are arranged to form a rectangular wave shape on each of the first sides 28a to the fourth sides 28d of the first large lattices 14A as shown in FIG. 9 and that two or more rectangles are arranged to form a rectangular wave shape on each of the fifth sides 28e to the eighth sides 28h of the second large lattices 14B as shown in FIG. 10.

Figure 9:
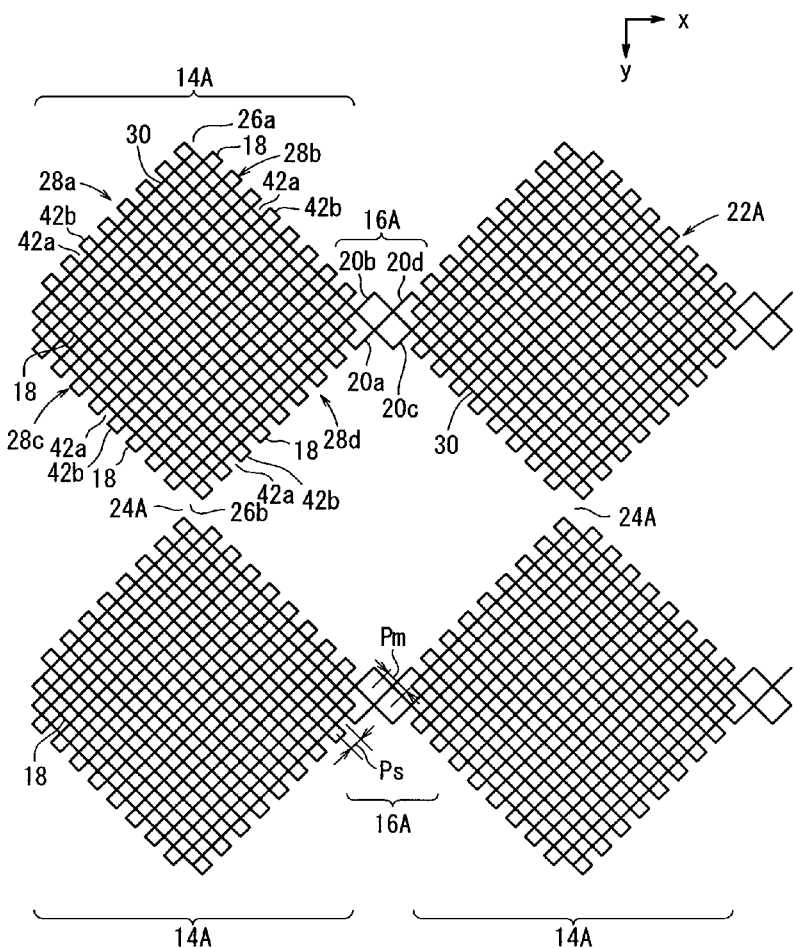
FIG. 9 is a plan view showing an example of a first conductive pattern formed on a first conductive sheet in the second laminated conductive sheet.

Specifically, as shown in FIG. 9, the first large lattice 14A in the second laminated conductive sheet 50B is such that each alternate comb tooth 32 on the first side 28a and the second side 28b of the first large lattice 14A in the first conductive sheet 10A shown in FIG. 1 is connected to the next comb tooth 32 to form the small lattice 18 and each straight line 30 on the third side 28c and the fourth side 28d is separated in the alternate small lattices 18, whereby the two or more rectangles are arranged to form the rectangular wave shape on each of the first sides 28a to the fourth sides 28d. Particularly, in the first large lattice 14A, the rectangles on the first side 28a are alternated with those on the fourth side 28d facing the first side 28a, and the rectangles on the second side 28b are alternated with those on the third side 28c facing the second side 28b.

Figure 10:
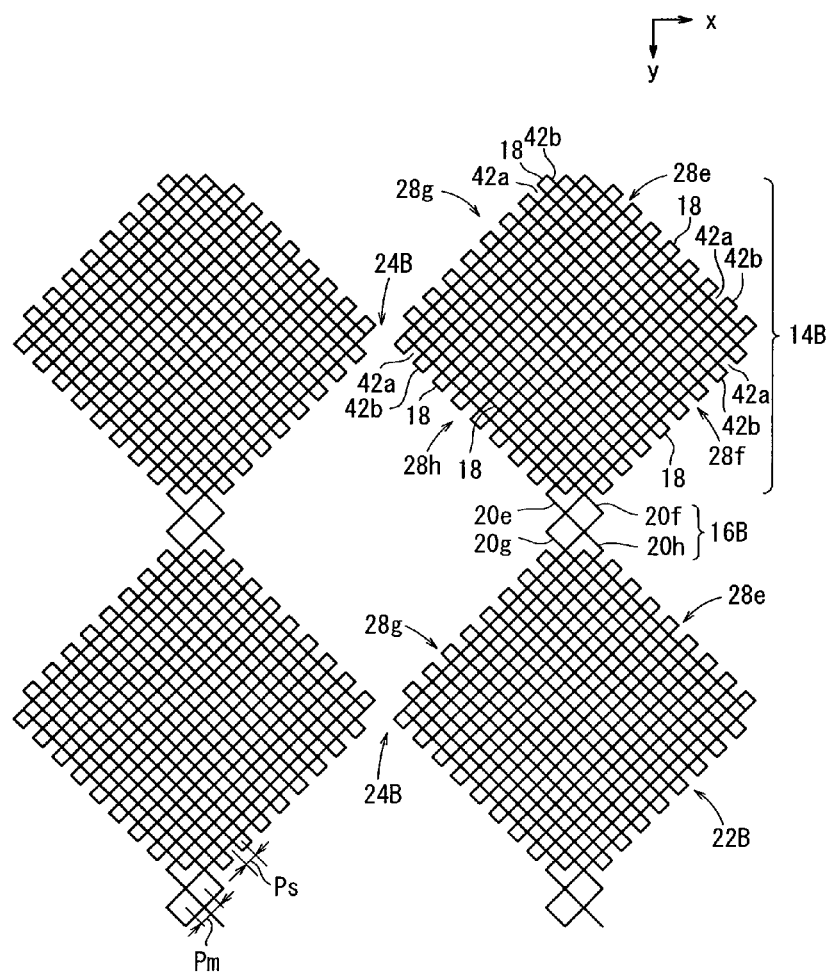
FIG. 10 is a plan view showing an example of a second conductive pattern formed on a second conductive sheet in the second laminated conductive sheet.

Similarly, as shown in FIG. 10, the second large lattice 14B in the second laminated conductive sheet 50B is such that each alternate comb tooth 32 on the fifth side 28e and the seventh side 28g of the second large lattice 14B in the second conductive sheet 10B shown in FIG. 6 is connected to the next comb tooth 32 to form the small lattice 18 and each straight line 30 on the sixth side 28f and the eighth side 28h is separated in the alternate small lattices 18, whereby the two or more rectangles are arranged to form the rectangular wave shape on each of the fifth sides 28e to the eighth sides 28h. Particularly, in the second large lattice 14B, the rectangles on the fifth side 28e are alternated with those on the eighth side 28h facing the fifth side 28e, and the rectangles on the sixth side 28f are alternated with those on the seventh side 28g facing the sixth side 28f.

Figure 11:
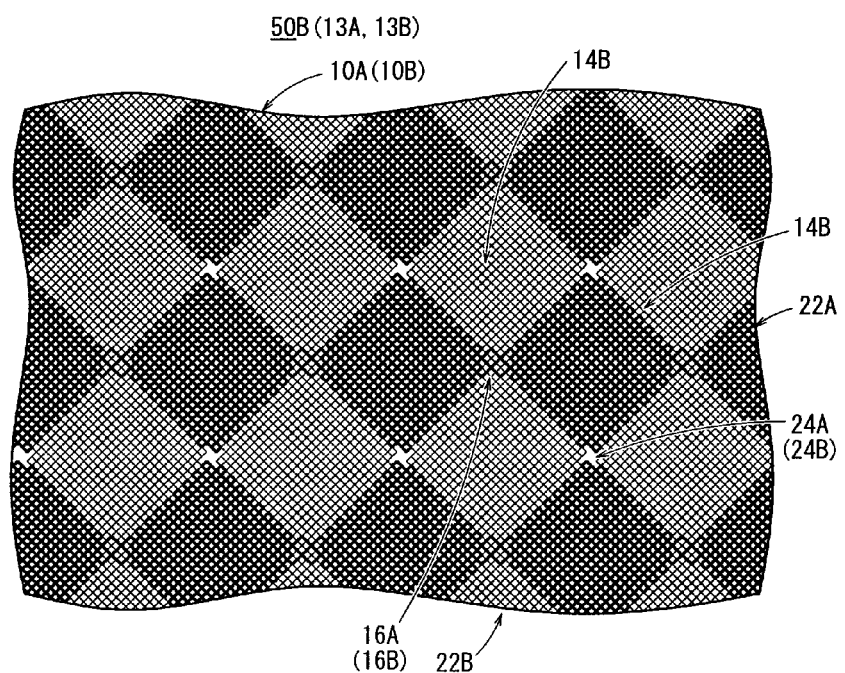
FIG. 11 is a plan view partially showing an example of the second laminated conductive sheet obtained by combining the first and second conductive sheets.

For example, as shown in FIG. 11, when the first conductive sheet 10A is stacked on the second conductive sheet 10B to form the second laminated conductive sheet 50B, as in the first laminated conductive sheet 50A (see FIG. 7), the first connections 16A of the first conductive patterns 22A and the second connections 16B of the second conductive patterns 22B are arranged facing each other with the first transparent substrate 12A (see FIG. 5A) in between, and also the first insulations 24A between the first conductive patterns 22A and the second insulations 24B between the second conductive patterns 22B are arranged facing each other with the first transparent substrate 12A in between. Though the first conductive patterns 22A and the second conductive patterns 22B are exaggeratingly shown by thick lines and thin lines respectively to clearly represent the positions thereof in FIG. 11 as well as FIG. 7, they have the same line width.

When the stacked first conductive sheet 10A and second conductive sheet 10B are observed from above, the spaces between the first large lattices 14A of the first conductive sheet 10A are filled with the second large lattices 14B of the second conductive sheet 10B. In this observation, the opening of each concave 42a on the rectangular wave shapes of the first sides 28a and the second sides 28b in the first large lattices 14A are connected to the end of each convex 42b on the rectangular wave shapes of the sixth sides 28f and the eighth sides 28h in the second large lattices 14B, so that the small lattices 18 are continuously arranged over the stack. Similarly, the opening of each concave 42a on the rectangular wave shapes of the third sides 28c and the fourth sides 28d in the first large lattices 14A are connected to the end of each convex 42b on the rectangular wave shapes of the fifth sides 28e and the seventh sides 28g in the second large lattices 14B, so that the small lattices 18 are continuously arranged over the stack. As a result, the boundaries between the first large lattices 14A and the second large lattices 14B cannot be easily found. Thus, the openings of the concaves 42a overlap with the ends of the convexes 42b in the rectangular wave shapes, whereby the boundaries between the first large lattices 14A and the second large lattices 14B are less visible to improve the visibility. Though a cross-shaped opening is formed in each overlap of the first insulation 24A and the second insulation 24B, the opening does not block a light and is less visible unlike the above thickened line.

In the overlaps of the first connections 16A and the second connections 16B in the second laminated conductive sheet 50B, as in the first laminated conductive sheet 50A, the connection point of the fifth medium lattice 20e and the seventh medium lattice 20g in the second connection 16B is positioned approximately at the center of the second medium lattice 20b in the first connection 16A, the connection point of the sixth medium lattice 20f and the eighth medium lattice 20h in the second connection 16B is positioned approximately at the center of the third medium lattice 20c in the first connection 16A, and the first medium lattices 20a to the eighth medium lattices 20h form a plurality of the small lattices 18 in combination. Therefore, the plural small lattices 18 are formed by the combination of the first connections 16A and the second connections 16B in the overlaps. Thus formed small lattices 18 cannot be distinguished from the surrounding small lattices 18 in the first large lattices 14A and the second large lattices 14B, so that the visibility is improved.

Though not shown in the drawings, the arrangement of the first wire connections 40a and the second wire connections 40b, the arrangement of the first terminal wiring patterns 41a and the second terminal wiring patterns 41b in the terminal wiring region 114, and the arrangement of the first terminals 116a and the second terminals 116b in the second laminated conductive sheet 50B are equal to those in the first laminated conductive sheet 50A.

Thus, when the second laminated conductive sheet 50B is used in the projected capacitive touch panel 100 or the like, the response speed and the size of the touch panel 100 can be easily increased. Furthermore, the boundaries between the first large lattices 14A of the first conductive sheet 10A and the second large lattices 14B of the second conductive sheet 10B are less visible, and the first connections 16A and the second connections 16B form the plural small lattices 18 in combination, so that defects such as local line thickening can be prevented, and the overall visibility can be improved.

Particularly in the second laminated conductive sheet 50B, the four sides (the first side 28a to the fourth side 28d) of the first large lattice 14A and the four sides (the fifth side 28e to the eighth side 28h) of the second large lattice 14B have the equivalent rectangular wave shapes, whereby charge localization in the ends of the first large lattices 14A and the second large lattices 14B can be reduced to prevent false finger position detection.

Also in the second laminated conductive sheet, as shown in FIG. 5A, the projected distance Lf between the straight line 30 along a side of the first large lattice 14A and the straight line 30 along a side of the second large lattice 14B is approximately equal to the side length of the small lattice 18 (50 to 500 μm). Furthermore, only the rectangle corners in the rectangular wave shapes on the sides of the first large lattice 14A overlap with the rectangle corners in the rectangular wave shapes on the sides of the second large lattice 14B, whereby only a small parasitic capacitance is formed between the first large lattice 14A and the second large lattice 14B. As a result, also the CR time constant can be reduced to improve the detection accuracy and the response speed.

A touch panel conductive sheet according to a third embodiment (hereinafter referred to as the third laminated conductive sheet 50C) will be described below with reference to FIGS. 12 to 14.

The third laminated conductive sheet 50C has approximately the same structure as the above first laminated conductive sheet 50A. The third laminated conductive sheet 50C is different from the first laminated conductive sheet 50A in that a first auxiliary line 52a of a thin metal wire separated from the first large lattices 14A is formed in each first insulation 24A of the first conductive part 13A in the first conductive sheet 10A as shown in FIG. 12 and that a second auxiliary line 52b of a thin metal wire separated from the second large lattices 14B is formed in each second insulation 24B of the second conductive part 13B in the second conductive sheet 10B as shown in FIG. 13.

Figure 12:
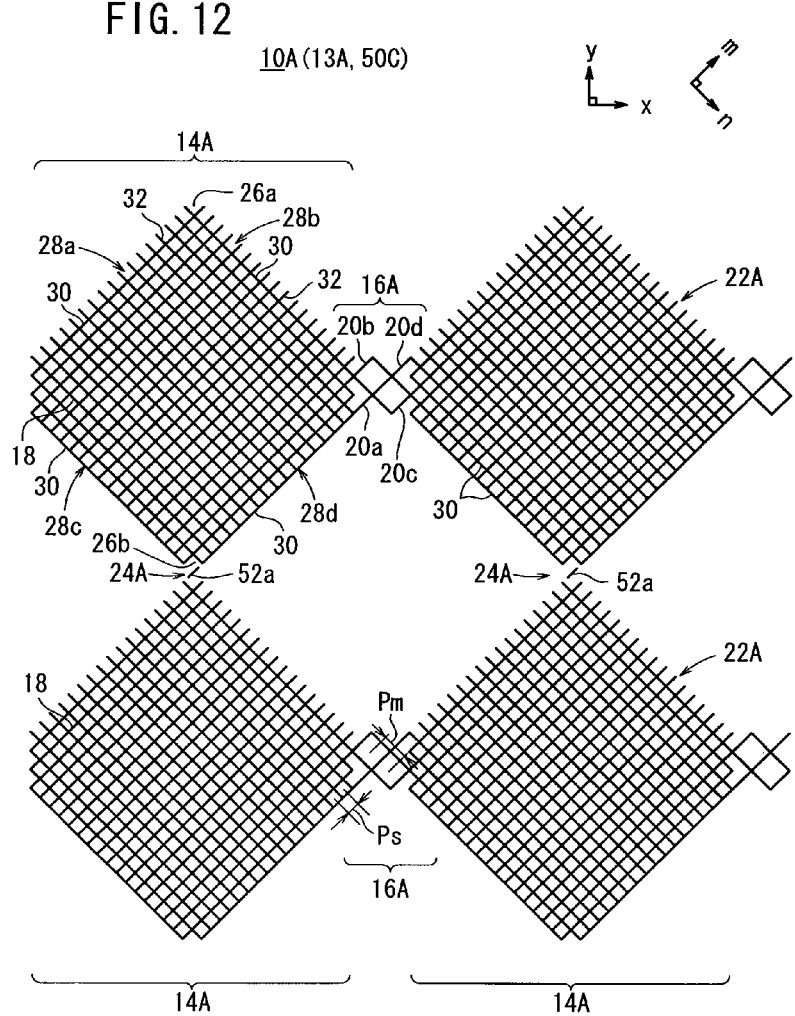
FIG. 12 is a plan view showing an example of a first conductive pattern formed on a first conductive sheet in a third laminated conductive sheet.

As shown in FIG. 12, the first auxiliary line 52a extends in the third direction (the m direction) bisecting the angle between the first direction (the x direction) and the second direction (the y direction), and has a length equal to the side length of the small lattice 18. As shown in FIG. 13, the second auxiliary line 52b extends in the fourth direction (the n direction) perpendicular to the third direction (the m direction), and has a length equal to the side length of the small lattice 18.

Figure 14:
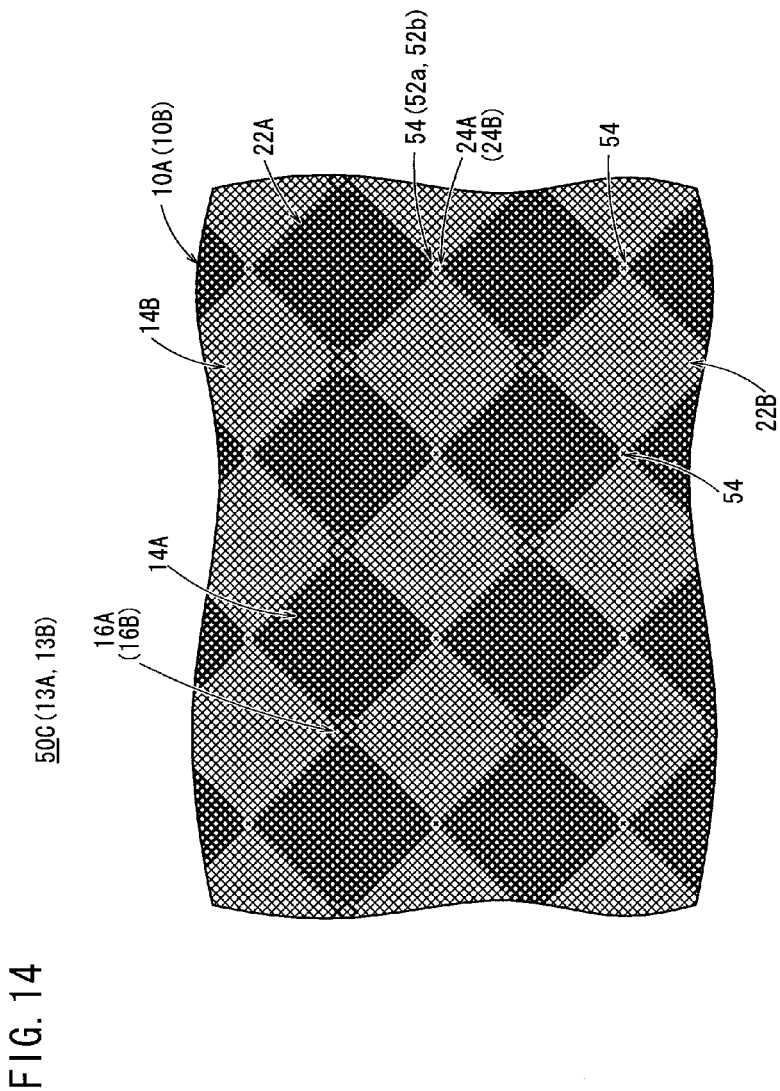
FIG. 14 is a plan view partially showing an example of the third laminated conductive sheet obtained by combining the first and second conductive sheets.

For example, as shown in FIG. 14, when the first conductive sheet 10A is stacked on the second conductive sheet 10B to form the third laminated conductive sheet 50C, as in the first laminated conductive sheet 50A (see FIG. 7), the first connections 16A of the first conductive patterns 22A and the second connections 16B of the second conductive patterns 22B are arranged facing each other with the first transparent substrate 12A (see FIG. 5A) in between, and also the first insulations 24A between the first conductive patterns 22A and the second insulations 24B between the second conductive patterns 22B are arranged facing each other with the first transparent substrate 12A in between. Particularly, the combined pattern 54 of the first insulation 24A and the second insulation 24B is such that the first auxiliary line 52a and the second auxiliary line 52b are perpendicularly crossed and do not overlap with the first conductive patterns 22A and the second conductive patterns 22B.

Thus, in the third laminated conductive sheet 50C, the combined patterns 54 of the first insulations 24A (the first auxiliary lines 52a) and the second insulations 24B (the second auxiliary lines 52b) are arranged between the first conductive patterns 22A and between the second conductive patterns 22B, so that the openings having the same size as the medium lattice are not formed between the first conductive patterns 22A and between the second conductive patterns 22B, and the boundaries between the first large lattices 14A and the second large lattices 14B are less visible. Particularly, since the first auxiliary line 52a and the second auxiliary line 52b are perpendicularly crossed in the combined pattern 54, the appearance of the combined pattern 54 is such that four small lattices 18 are arranged in a matrix. Therefore, the appearance of the third laminated conductive sheet 50C is such that the entire surface is covered with a large number of the small lattices 18. This appearance is preferred from the viewpoint of improving the visibility. Furthermore, since the first auxiliary line 52a is not connected to the first conductive patterns 22A and the second auxiliary line 52b is not connected to the second conductive patterns 22B, the first conductive patterns 22A can be electrically insulated from each other and the second conductive patterns 22B can be electrically insulated from each other.

A touch panel conductive sheet according to a fourth embodiment (hereinafter referred to as the fourth laminated conductive sheet 50D) will be described below with reference to FIGS. 15 to 17.

The fourth laminated conductive sheet 50D has approximately the same structure as the above second laminated conductive sheet 50B. The fourth laminated conductive sheet 50D is different from the second laminated conductive sheet 50B in that a first auxiliary line 52a separated from the first large lattices 14A is formed in each first insulation 24A of the first conductive part 13A in the first conductive sheet 10A as shown in FIG. 15 and that a second auxiliary line 52b separated from the second large lattices 14B is formed in each second insulation 24B of the second conductive part 13B in the second conductive sheet 10B as shown in FIG. 16.

Figure 15:
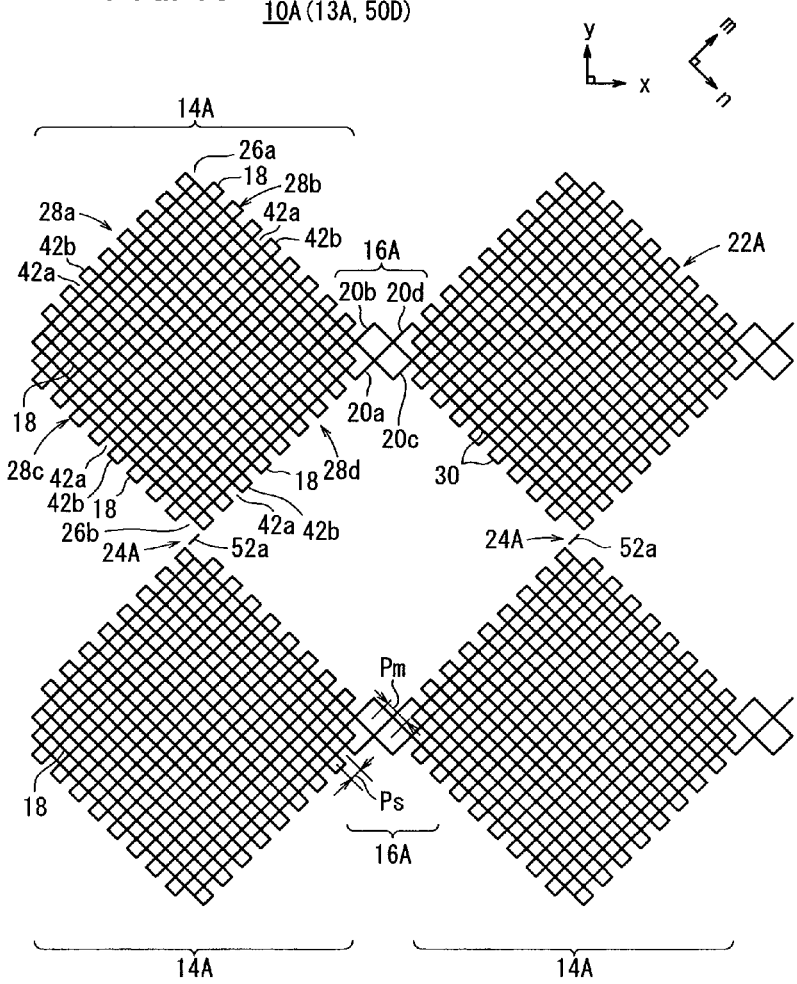
FIG. 15 is a plan view showing an example of a first conductive pattern formed on a first conductive sheet in a fourth laminated conductive sheet.
Figure 16:
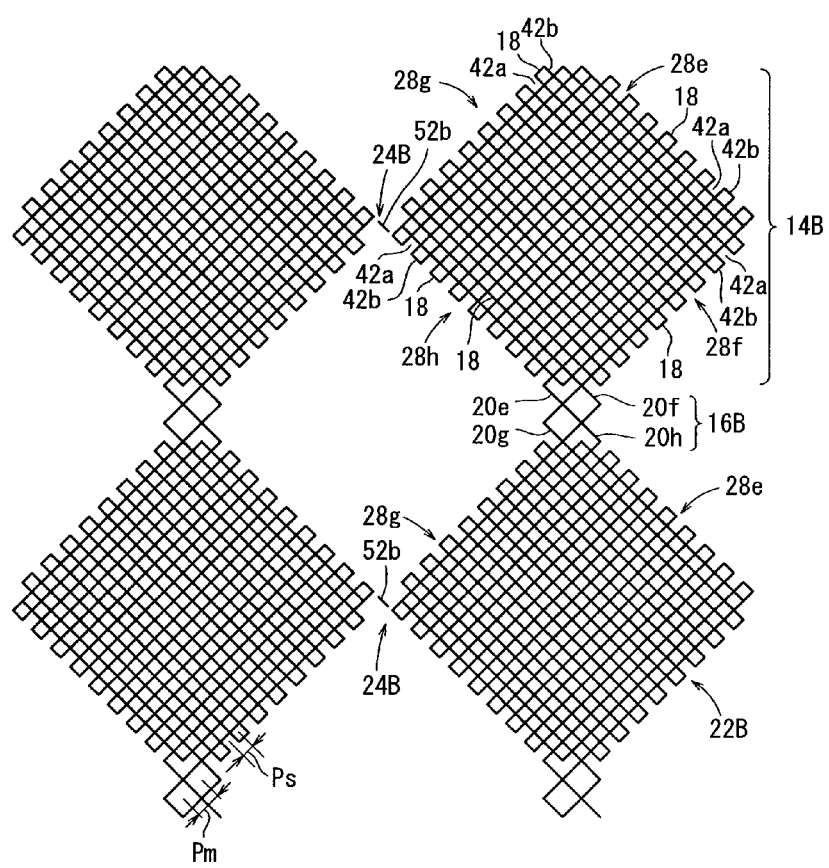
FIG. 16 is a plan view showing an example of a second conductive pattern formed on a second conductive sheet in the fourth laminated conductive sheet.

As shown in FIG. 15, the first auxiliary line 52a extends in the third direction (the m direction) and has a length equal to the side length of the small lattice 18. As shown in FIG. 16, the second auxiliary line 52b extends in the fourth direction (the n direction) and has a length equal to the side length of the small lattice 18.

Figure 17:
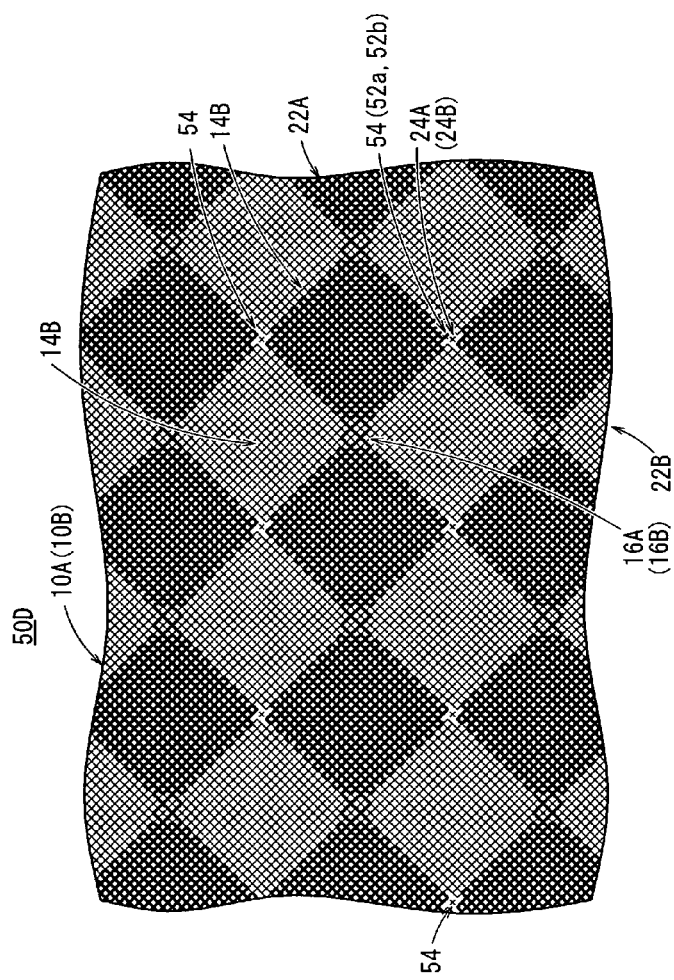
FIG. 17 is a plan view partially showing an example of the fourth laminated conductive sheet obtained by combining the first and second conductive sheets.

Thus, as shown in FIG. 17, also in the fourth laminated conductive sheet 50D, the combined pattern 54 of the first insulation 24A and the second insulation 24B is such that the first auxiliary line 52a and the second auxiliary line 52b are perpendicularly crossed and do not overlap with the first conductive patterns 22A and the second conductive patterns 22B. Therefore, the cross-shaped openings having the same size as a plurality of the small lattices 18 arranged in an approximately cross shape are not formed between the first conductive patterns 22A and between the second conductive patterns 22B, and the boundaries between the first large lattices 14A and the second large lattices 14B are less visible. As a result, the appearance of the fourth laminated conductive sheet 50D is such that the entire surface is covered with a large number of the small lattices 18. This appearance is preferred from the viewpoint of improving the visibility. Furthermore, the first conductive patterns 22A can be electrically insulated from each other and the second conductive patterns 22B can be electrically insulated from each other.

A touch panel conductive sheet according to a fifth embodiment (hereinafter referred to as the fifth laminated conductive sheet 50E) will be described below with reference to FIGS. 18 to 20.

Figure 18:
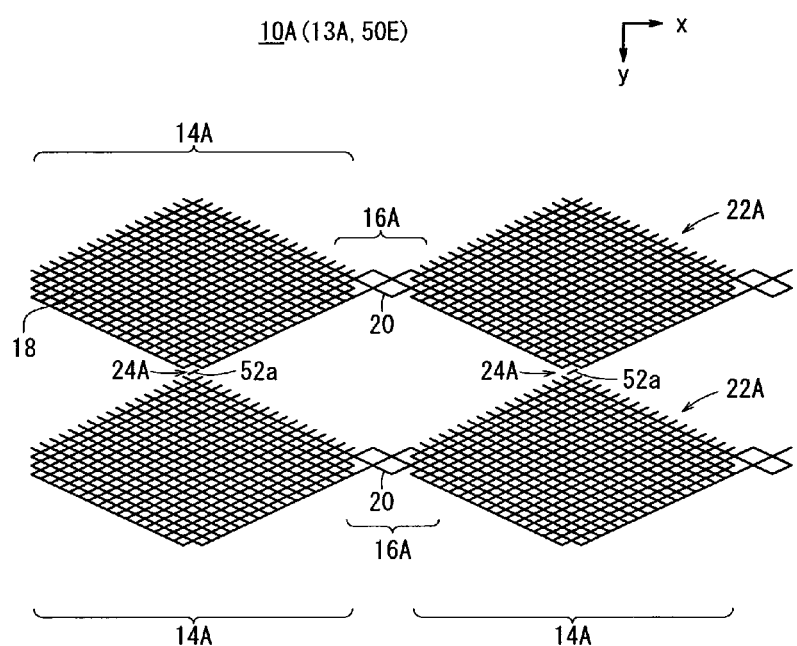
FIG. 18 is a plan view showing an example of a first conductive pattern formed on a first conductive sheet in a fifth laminated conductive sheet.
Figure 19:
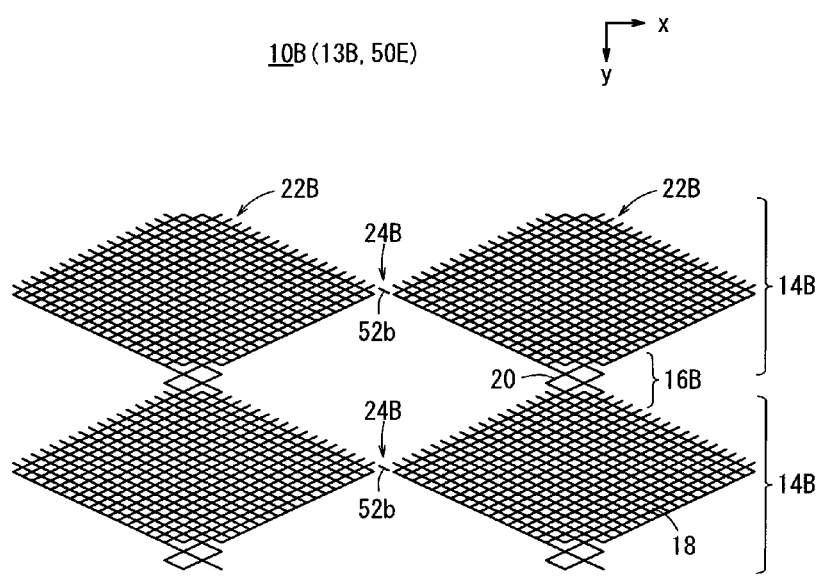
FIG. 19 is a plan view showing an example of a second conductive pattern formed on a second conductive sheet in the fifth laminated conductive sheet.

The fifth laminated conductive sheet 50E has approximately the same structure as the above first laminated conductive sheet 50A, and is different from the first laminated conductive sheet 50A in that the small lattices 18 have a rhombic shape as shown in FIGS. 18 and 19. In relation thereto, also the first large lattices 14A, the second large lattices 14B, and the medium lattices 20 have rhombic shapes. Furthermore, as in the above third laminated conductive sheet 50C, the first auxiliary line 52a separated from the first large lattices 14A is formed in each first insulation 24A (see FIG. 18) and the second auxiliary line 52b separated from the second large lattices 14B is formed in each second insulation 24B (see FIG. 19).

As shown in FIG. 18, the first auxiliary line 52a extends along a side of the first large lattice 14A and has a length equal to the side length of the small lattice 18. The first auxiliary line 52a extends obliquely to the upper right in the example of FIG. 18. As shown in FIG. 19, the second auxiliary line 52b extends along a side of the second large lattice 14B and has a length equal to the side length of the small lattice 18. The second auxiliary line 52b extends obliquely to the lower right in the example of FIG. 19.

Figure 20:
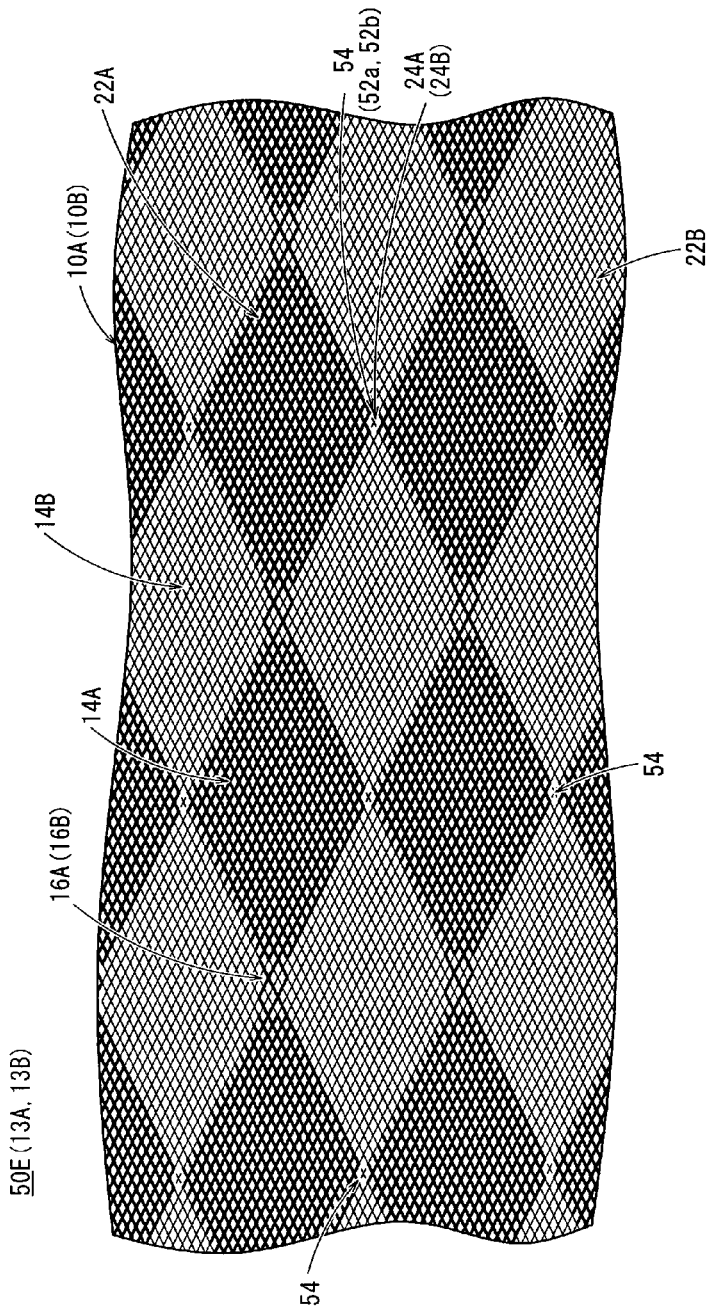
FIG. 20 is a plan view partially showing an example of the fifth laminated conductive sheet obtained by combining the first and second conductive sheets.

For example, as shown in FIG. 20, when the first conductive sheet 10A is stacked on the second conductive sheet 10B to form the fifth laminated conductive sheet 50E, as in the third laminated conductive sheet 50C (see FIG. 14), the combined pattern 54 of the first insulation 24A and the second insulation 24B is such that the first auxiliary line 52a and the second auxiliary line 52b are crossed at an angle approximately equal to the vertex angle of the rhomboid of the small lattice 18 and do not overlap with the first conductive patterns 22A and the second conductive patterns 22B.

Thus, in the fifth laminated conductive sheet 50E, the combined patterns 54 of the first insulations 24A (the first auxiliary lines 52a) and the second insulations 24B (the second auxiliary lines 52b) are arranged between the first conductive patterns 22A and between the second conductive patterns 22B, so that the openings having the same size as the rhombic medium lattice are not formed between the first conductive patterns 22A and between the second conductive patterns 22B, and the boundaries between the first large lattices 14A and the second large lattices 14B are less visible. Particularly, since the first auxiliary line 52a and the second auxiliary line 52b are crossed at the angle approximately equal to the vertex angle of the rhomboid of the small lattice 18 in the combined pattern 54, the appearance of the combined pattern 54 is such that four rhombic small lattices 18 are arranged in a matrix. Therefore, the appearance of the fifth laminated conductive sheet 50E is such that the entire surface is covered with a large number of the small lattices 18. This appearance is preferred from the viewpoint of improving the visibility. Furthermore, since the first auxiliary line 52a is not connected to the first conductive patterns 22A and the second auxiliary line 52b is not connected to the second conductive patterns 22B, the first conductive patterns 22A can be electrically insulated from each other and the second conductive patterns 22B can be electrically insulated from each other.

Figure 22:
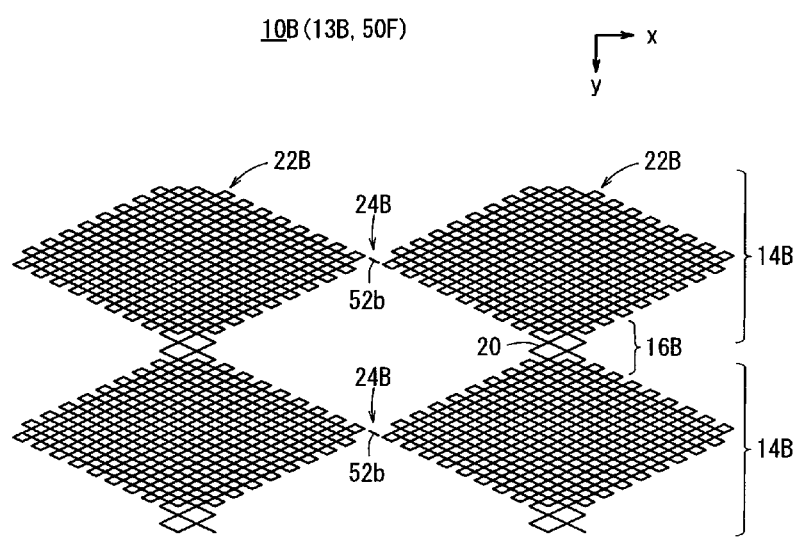
FIG. 22 is a plan view showing an example of a second conductive pattern formed on a second conductive sheet in the sixth laminated conductive sheet.
Figure 23:
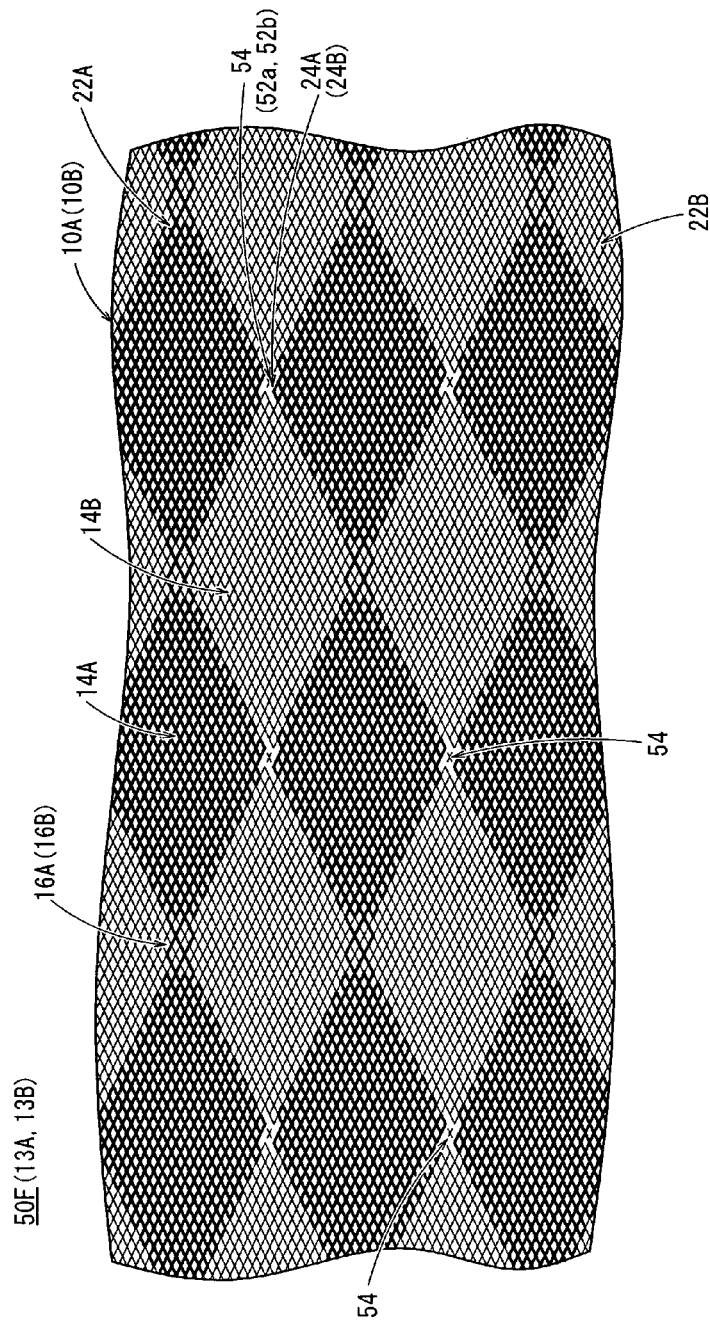
FIG. 23 is a plan view partially showing an example of the sixth laminated conductive sheet obtained by combining the first and second conductive sheets.

A touch panel conductive sheet according to a sixth embodiment (hereinafter referred to as the sixth laminated conductive sheet 50F) will be described below with reference to FIGS. 21 to 23.

The sixth laminated conductive sheet 50F has approximately the same structure as the above second laminated conductive sheet 50B. The sixth laminated conductive sheet 50F is different from the second laminated conductive sheet 50B in that the small lattices 18, the first large lattices 14A, the second large lattices 14B, and the medium lattices 20 have rhombic shapes as shown in FIGS. 21 and 22, and that the first auxiliary line 52a separated from the first large lattices 14A is formed in each first insulation 24A (see FIG. 21) and the second auxiliary line 52b separated from the second large lattices 14B is formed in each second insulation 24B (see FIG. 22) as in the above fourth laminated conductive sheet 50D.

Figure 21:
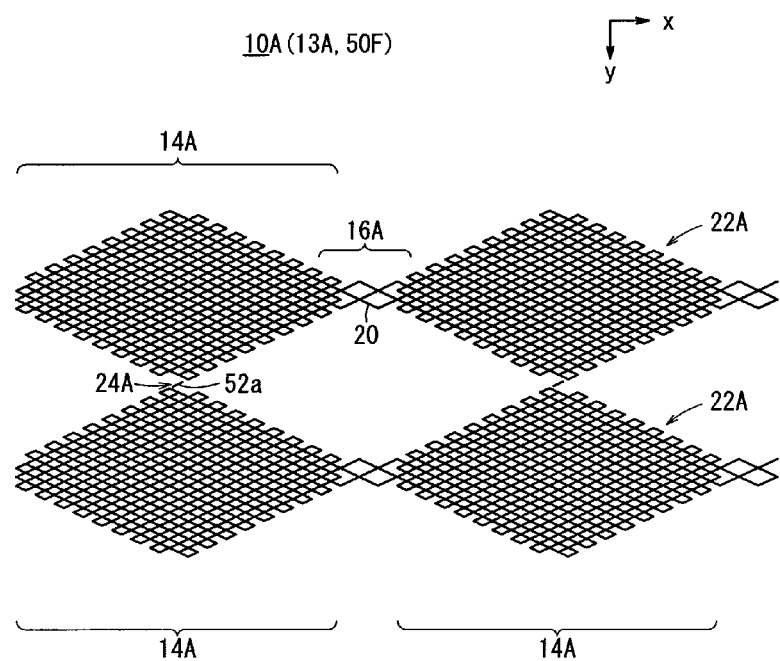
FIG. 21 is a plan view showing an example of a first conductive pattern formed on a first conductive sheet in a sixth laminated conductive sheet.

As shown in FIG. 21, the first auxiliary line 52a extends along a side of the first large lattice 14A and has a length equal to the side length of the small lattice 18. As shown in FIG. 22, the second auxiliary line 52b extends along a side of the second large lattice 14B and has a length equal to the side length of the small lattice 18.

Thus, in the sixth laminated conductive sheet 50F, as in the fifth laminated conductive sheet 50E, the first auxiliary line 52a and the second auxiliary line 52b are crossed at the angle approximately equal to the vertex angle of the rhomboid of the small lattice 18 and do not overlap with the first conductive patterns 22A and the second conductive patterns 22B. Therefore, the cross-shaped openings having the same size as a plurality of the small lattices 18 arranged in an approximately cross shape are not formed between the first conductive patterns 22A and between the second conductive patterns 22B, and the boundaries between the first large lattices 14A and the second large lattices 14B are less visible. As a result, the appearance of the sixth laminated conductive sheet 50F is such that the entire surface is covered with a large number of the small lattices 18. This appearance is preferred from the viewpoint of improving the visibility. Furthermore, the first conductive patterns 22A can be electrically insulated from each other and the second conductive patterns 22B can be electrically insulated from each other.

Though the arrangement pitch Pm of the medium lattices 20 in the first connections 16A and the second connections 16B is twice larger than the arrangement pitch Ps of the small lattices 18 in the first conductive sheet 10A and the second conductive sheet 10B of the above embodiments, the pitch Pm may be appropriately selected depending on the number of the medium lattices 20. For example, the pitch Pm may be 1.5 or 3 times larger than the pitch Ps. When the pitch Pm of the medium lattices 20 is excessively small or large, it may be difficult to arrange the large lattices 14, resulting in poor appearance. Thus, the pitch Pm is preferably 1 to 10 times, more preferably 1 to 5 times, further preferably 3 to 5 times, larger than the pitch Ps of the small lattices 18.

Also the sizes of the small lattices 18 (including the side length, the diagonal line length, and the rhomboid vertex angle), the number of the small lattices 18 in the first large lattice 14A, and the number of the small lattices 18 in the second large lattice 14B may be appropriately selected depending on the size and the resolution (the line number) of the touch panel using the conductive sheet.

Though the first conductive sheet 10A and the second conductive sheet 10B are used in the projected capacitive touch panel 100 in the above embodiments, they can be used in a surface capacitive touch panel or a resistive touch panel.

The first conductive sheet 10A and the second conductive sheet 10B may be produced as follows. For example, a photosensitive material having the first transparent substrate 12A or the second transparent substrate 12B and thereon a photosensitive silver halide-containing emulsion layer may be exposed and developed, whereby metallic silver portions and light-transmitting portions may be formed in the exposed areas and the unexposed areas respectively to obtain the first conductive patterns 22A or the second conductive patterns 22B. The metallic silver portions may be subjected to a physical development treatment and/or a plating treatment to deposit a conductive metal thereon.

Alternatively, a photoresist film on a copper foil formed on the first transparent substrate 12A or the second transparent substrate 12B may be exposed and developed to form a resist pattern, and the copper foil exposed from the resist pattern may be etched to obtain the first conductive patterns 22A or the second conductive patterns 22B.

Alternatively, a paste containing fine metal particles may be printed on the first transparent substrate 12A or the second transparent substrate 12B, and the printed paste may be plated with a metal to obtain the first conductive patterns 22A or the second conductive patterns 22B.

The first conductive patterns 22A or the second conductive patterns 22B may be printed on the first transparent substrate 12A or the second transparent substrate 12B by using a screen or gravure printing plate.

The first conductive patterns 22A or the second conductive patterns 22B may be formed on the first transparent substrate 12A or the second transparent substrate 12B by using an inkjet method.

A particularly preferred method, which contains using a photographic photosensitive silver halide material for producing the first conductive sheet 10A and the second conductive sheet 10B according to an embodiment of the present invention, will be mainly described below.

The method for producing the first conductive sheet 10A and the second conductive sheet 10B of this embodiment includes the following three processes, depending on the photosensitive materials and development treatments.

(1) A process comprising subjecting a photosensitive black-and-white silver halide material free of physical development nuclei to a chemical or thermal development, to form the metallic silver portions on the photosensitive material.

(2) A process comprising subjecting a photosensitive black-and-white silver halide material having a silver halide emulsion layer containing physical development nuclei to a solution physical development, to form the metallic silver portions on the photosensitive material.

(3) A process comprising subjecting a stack of a photosensitive black-and-white silver halide material free of physical development nuclei and an image-receiving sheet having a non-photosensitive layer containing physical development nuclei to a diffusion transfer development, to form the metallic silver portions on the non-photosensitive image-receiving sheet.

In the process of (1), an integral black-and-white development procedure is used to form a transmittable conductive film such as a light-transmitting conductive film on the photosensitive material. The resulting silver is a chemically or thermally developed silver containing a high-specific surface area filament, and thereby shows a high activity in the following plating or physical development treatment.

In the process of (2), the silver halide particles are melted around the physical development nuclei and deposited on the nuclei in the exposed areas to form a transmittable conductive film such as a light-transmitting conductive film on the photosensitive material. Also in this process, an integral black-and-white development procedure is used. Though high activity can be achieved since the silver halide is deposited on the physical development nuclei in the development, the developed silver has a spherical shape with small specific surface.

In the process of (3), the silver halide particles are melted in the unexposed areas, and diffused and deposited on the development nuclei of the image-receiving sheet, to form a transmittable conductive film such as a light-transmitting conductive film on the sheet. In this process, a so-called separate-type procedure is used, and the image-receiving sheet is peeled off from the photosensitive material.

A negative or reversal development treatment can be used in the processes. In the diffusion transfer development, the negative development treatment can be carried out using an auto-positive photosensitive material.

The chemical development, thermal development, solution physical development, and diffusion transfer development have the meanings generally known in the art, and are explained in common photographic chemistry texts such as Shin-ichi Kikuchi, "*Shashin Kagaku (Photographic Chemistry)*", Kyoritsu Shuppan Co., Ltd., 1955 and C. E. K. Mees, "*The Theory of Photographic Processes,* 4th ed.", Mcmillan, 1977. A liquid treatment is generally used in the present invention, and also a thermal development treatment can be utilized. For example, techniques described in Japanese Laid-Open Patent Publication Nos. 2004-184693, 2004-334077, and 2005-010752, and Japanese Patent Application Nos. 2004-244080 and 2004-085655 can be used in the present invention.

The structure of each layer in the first conductive sheet 10A and the second conductive sheet 10B of this embodiment will be described in detail below.

[First Transparent Substrate 12a and Second Transparent Substrate 12B]

The first transparent substrate 12A and the second transparent substrate 12B may be a plastic film, a plastic plate, a glass plate, etc.

Examples of materials for the plastic film and the plastic plate include polyesters such as polyethylene terephthalates (PET) and polyethylene naphthalates; polyolefins such as polyethylenes (PE), polypropylenes (PP), polystyrenes, and EVA; vinyl resins; polycarbonates (PC); polyamides; polyimides; acrylic resins; and triacetyl celluloses (TAC).

The first transparent substrate 12A and the second transparent substrate 12B are preferably a film or plate of a plastic having a melting point of about 290° C. or lower, such as PET (melting point 258° C.), PEN (melting point 269° C.), PE (melting point 135° C.), PP (melting point 163° C.), polystyrene (melting point 230° C.), polyvinyl chloride (melting point 180° C.), polyvinylidene chloride (melting point 212° C.), or TAC (melting point 290° C.). The PET is particularly preferred from the viewpoints of light transmittance, workability, etc. The conductive film such as the first conductive sheet 10A or the second conductive sheet 10B used in the first laminated conductive sheet 50A or the second laminated conductive sheet 50B is required to be transparent, and therefore the first transparent substrate 12A and the second transparent substrate 12B preferably have a high transparency.

[Silver Salt Emulsion Layer]

The silver salt emulsion layer to be converted to the conductive layer in the first conductive sheet 10A or the second conductive sheet 10B (the conductive portions including the first large lattices 14A, the first connections 16A, the second large lattices 14B, the second connections 16B, and the small lattices 18) contains a silver salt and a binder, and may contain a solvent and an additive such as a dye in addition thereto.

The silver salt used in this embodiment may be an inorganic silver salt such as a silver halide or an organic silver salt such as silver acetate. In this embodiment, the silver halide is preferred because of its excellent light sensing property.

The applied silver amount (the amount of the applied silver salt in the silver density) of the silver salt emulsion layer is preferably 1 to 30 g/m$^2$, more preferably 1 to 25 g/m$^2$, further preferably 5 to 20 g/m$^2$. When the applied silver amount is within this range, the resultant first laminated conductive sheet 50A or second laminated conductive sheet 50B can exhibit a desired surface resistance.

Examples of the binders used in this embodiment include gelatins, polyvinyl alcohols (PVA), polyvinyl pyrolidones (PVP), polysaccharides such as starches, celluloses and derivatives thereof, polyethylene oxides, polyvinylamines, chitosans, polylysines, polyacrylic acids, polyalginic acids, polyhyaluronic acids, and carboxycelluloses. The binders show a neutral, anionic, or cationic property depending on the ionicity of a functional group.

In this embodiment, the amount of the binder in the silver salt emulsion layer is not particularly limited, and may be appropriately selected to obtain sufficient dispersion and adhesion properties. The volume ratio of silver/binder in the silver salt emulsion layer is preferably 1/4 or more, more preferably 1/2 or more. Furthermore, the silver/binder volume ratio is preferably 100/1 or less, more preferably 50/1 or less. Particularly, the silver/binder volume ratio is further preferably 1/1 to 4/1, most preferably 1/1 to 3/1. When the silver/binder volume ratio of the silver salt emulsion layer is within the range, the resistance variation can be reduced even under various applied silver amount. Thus, the first laminated conductive sheet 50A or the second laminated conductive sheet 50B can be produced with a uniform surface resistance. The silver/binder volume ratio can be obtained by converting the silver halide/binder weight ratio of the material to the silver/binder weight ratio, and by further converting the silver/binder weight ratio to the silver/binder volume ratio.

<Solvent>

The solvent used for forming the silver salt emulsion layer is not particularly limited, and Examples thereof include water, organic solvents (e.g. alcohols such as methanol, ketones such as acetone, amides such as formamide, sulfoxides such as dimethyl sulfoxide, esters such as ethyl acetate, ethers), ionic liquids, and mixtures thereof.

In this embodiment, the ratio of the solvent to the total of the silver salt, the binder, and the like in the silver salt emulsion layer is 30% to 90% by mass, preferably 50% to 80% by mass.

<Other Additives>

The additives used in this embodiment are not particularly limited, and may be preferably selected from known additives.

[Other Layers]

A protective layer (not shown) may be formed on the silver salt emulsion layer. The protective layer used in this embodiment contains a binder such as a gelatin or a high-molecular polymer, and is disposed on the photosensitive silver salt emulsion layer to improve the scratch prevention or mechanical property. The thickness of the protective layer is preferably 0.5 μm or less. The method of applying or forming the protective layer is not particularly limited, and may be appropriately selected from known applying or forming methods. In addition, an undercoat layer or the like may be formed below the silver salt emulsion layer.

The steps for producing the first conductive sheet 10A and the second conductive sheet 10B will be described below.

[Exposure]

In this embodiment, the first conductive patterns 22A and the second conductive patterns 22B may be formed in a printing process, and they may be formed by exposure and development treatments, etc. in another process. Thus, a photosensitive material having the first transparent substrate 12A or the second transparent substrate 12B and thereon the silver salt-containing layer or a photosensitive material coated with a photopolymer for photolithography is subjected to the exposure treatment. An electromagnetic wave may be used in the exposure. For example, the electromagnetic wave may be a light such as a visible light or an ultraviolet light, or a radiation ray such as an X-ray. The exposure may be carried out using a light source having a wavelength distribution or a specific wavelength.

[Development Treatment]

In this embodiment, the emulsion layer is subjected to the development treatment after the exposure. Common development treatment technologies for photographic silver salt films, photographic papers, print engraving films, emulsion masks for photomasking, and the like may be used in the present invention. The developer used in the development treatment is not particularly limited, and may be a PQ developer, an MQ developer, an MAA developer, etc. Examples of commercially available developers usable in the present invention include CN-16, CR-56, CP45X, FD-3, and PAPITOL available from FUJIFILM Corporation, C-41, E-6, RA-4, D-19, and D-72 available from Eastman Kodak Company, and developers contained in kits thereof. The developer may be a lith developer.

In the present invention, the development process may include a fixation treatment for removing the silver salt in the unexposed areas to stabilize the material. Fixation treatment technologies for photographic silver salt films, photographic papers, print engraving films, emulsion masks for photomasking, and the like may be used in the present invention.

In the fixation treatment, the fixation temperature is preferably about 20° C. to 50° C., more preferably 25° C. to 45° C. The fixation time is preferably 5 seconds to 1 minute, more preferably 7 to 50 seconds. The amount of the fixer is preferably 600 ml/m$^2$ or less, more preferably 500 ml/m$^2$ or less, particularly preferably 300 ml/m$^2$ or less, per 1 m$^2$ of the photosensitive material treated.

The developed and fixed photosensitive material is preferably subjected to a water washing treatment or a stabilization treatment. The amount of water used in the water washing or stabilization treatment is generally 20 L or less, and may be 3 L or less, per 1 m$^2$ of the photosensitive material. The water amount may be 0, and thus the photosensitive material may be washed with storage water.

The ratio of the metallic silver contained in the exposed areas after the development to the silver contained in the areas before the exposure is preferably 50% or more, more preferably 80% or more by mass. When the ratio is 50% or more by mass, a high conductivity can be achieved.

In this embodiment, the tone (gradation) obtained by the development is preferably more than 4.0, though not particularly restrictive. When the tone is more than 4.0 after the development, the conductivity of the conductive metal portion can be increased while maintaining the high transmittance of the light-transmitting portion. For example, the tone of 4.0 or more can be obtained by doping with rhodium or iridium ion.

The conductive sheet is obtained by the above steps. The surface resistance of the conductive sheet is preferably 0.1 to 100 ohm/sq, more preferably 1 to 10 ohm/sq. The conductive sheet may be subjected to a calendar treatment after the development treatment to obtain a desired surface resistance.

[Physical Development Treatment and Plating Treatment]

In this embodiment, to increase the conductivity of the metallic silver portion formed by the above exposure and development treatments, conductive metal particles may be deposited thereon by a physical development treatment and/or a plating treatment. In the present invention, the conductive metal particles may be deposited on the metallic silver portion by only one of the physical development and plating treatments or by the combination of the treatments. The metallic silver portion, subjected to the physical development treatment and/or the plating treatment in this manner, is also referred to as the conductive metal portion.

In this embodiment, the physical development is such a process that metal ions such as silver ions are reduced by a reducing agent, whereby metal particles are deposited on a metal or metal compound core. Such physical development has been used in the fields of instant B & W film, instant slide film, printing plate production, etc., and the technologies can be used in the present invention. The physical development may be carried out at the same time as the above development treatment after the exposure, and may be carried out after the development treatment separately.

In this embodiment, the plating treatment may contain electroless plating (such as chemical reduction plating or displacement plating), electrolytic plating, or a combination thereof. Known electroless plating technologies for printed circuit boards, etc. may be used in this embodiment. The electroless plating is preferably electroless copper plating.

[Oxidation Treatment]

In this embodiment, the metallic silver portion formed by the development treatment or the conductive metal portion formed by the physical development treatment and/or the plating treatment is preferably subjected to an oxidation treatment. For example, by the oxidation treatment, a small amount of a metal deposited on the light-transmitting portion can be removed, so that the transmittance of the light-transmitting portion can be increased to approximately 100%.

[Conductive Metal Portion]

In this embodiment, the lower limit of the line widths of the conductive metal portions (the first conductive part 13A and the second conductive part 13B) is preferably 1, 3, 4, or 5 μm, and the upper limit thereof is preferably 15, 10, 9, or 8 μm. When the line width is less than the lower limit, the conductive metal portion has an insufficient conductivity, whereby a touch panel using the conductive part has an insufficient detection sensitivity. On the other hand, when the line width is more than the upper limit, moire is significantly generated due to the conductive metal portion, and a touch panel using the conductive part has a poor visibility. When the line width is within the above range, moire of the conductive metal portion is improved, and the visibility is remarkably improved. The line distance (the distance between sides facing each other in the small lattice 18) is preferably 30 to 500 μm, more preferably 50 to 400 μm, most preferably 100 to 350 μm. The conductive metal portion may have a part with a line width of more than 200 μm for the purpose of ground connection, etc.

In this embodiment, the opening ratio (transmitting ratio) of the conductive metal portion is preferably 85% or more, more preferably 90% or more, most preferably 95% or more, in view of the visible light transmittance. The opening ratio is the ratio of the light-transmitting portions other than the conductive portions including the first large lattices 14A, the first connections 16A, the second large lattices 14B, the second connections 16B, and the small lattices 18 to the whole. For example, a square lattice having a line width of 15 μm and a pitch of 300 μm has an opening ratio of 90%.

[Light-Transmitting Portion]

In this embodiment, the light-transmitting portion is a portion having light transmittance, other than the conductive metal portions in the first conductive sheet 10A and the second conductive sheet 10B. The transmittance of the light-transmitting portion, which is herein a minimum transmittance value in a wavelength region of 380 to 780 nm obtained neglecting the light absorption and reflection of the first transparent substrate 12A and the second transparent substrate 12B, is 90% or more, preferably 95% or more, more preferably 97% or more, further preferably 98% or more, most preferably 99% or more.

The exposure is preferably carried out using a glass mask method or a laser lithography exposure method.

[First Conductive Sheet 10A and Second Conductive Sheet 10B]

In the first conductive sheet 10A and the second conductive sheet 10B of this embodiment, the thicknesses of the first transparent substrate 12A and the second transparent substrate 12B are preferably 5 to 350 μm, more preferably 30 to 150 μm. When the thicknesses are 5 to 350 μm, a desired visible light transmittance can be obtained, and the substrates can be easily handled.

The thickness of the metallic silver portion formed on the first transparent substrate 12A or the second transparent substrate 12B may be appropriately selected by controlling the thickness of the coating liquid for the silver salt-containing layer applied to the substrate. The thickness of the metallic silver portion may be selected within a range of 0.001 to 0.2 mm, and is preferably 30 μm or less, more preferably 20 μm or less, further preferably 0.01 to 9 μm, most preferably 0.05 to 5 μm. The metallic silver portion is preferably formed in a patterned shape. The metallic silver portion may have a monolayer structure or a multilayer structure containing two or more layers. In a case where the metallic silver portion has a patterned multilayer structure containing two or more layers, the layers may have different wavelength color sensitivities. In this case, different patterns can be formed in the layers by using exposure lights with different wavelengths.

In the case of using the first conductive sheet 10A or the second conductive sheet 10B in a touch panel, the conductive metal portion preferably has a smaller thickness. As the thickness is reduced, the viewing angle and visibility of the display panel are improved. Thus, the thickness of the layer of the conductive metal on the conductive metal portion is preferably less than 9 μm, more preferably 0.1 μm or more but less than 5 μm, further preferably 0.1 μm or more but less than 3 μm.

In this embodiment, the thickness of the metallic silver portion can be controlled by changing the coating thickness of the silver salt-containing layer, and the thickness of the conductive metal particle layer can be controlled in the physical development treatment and/or the plating treatment, whereby the first conductive sheet 10A and the second conductive sheet 10B having a thickness of less than 5 μm (preferably less than 3 μm) can be easily produced.

The plating or the like is not necessarily carried out in the method for producing the first conductive sheet 10A and the second conductive sheet 10B of this embodiment. This is because the desired surface resistance can be obtained by controlling the applied silver amount and the silver/binder volume ratio of the silver salt emulsion layer in the method. The calendar treatment or the like may be carried out if necessary.

(Film Hardening Treatment after Development Treatment)

It is preferred that after the silver salt emulsion layer is developed, the resultant is immersed in a hardener and thus subjected to a film hardening treatment. Examples of the hardeners include boric acid, 2,3-dihydroxy-1,4-dioxane, and dialdehydes such as glutaraldehyde and adipaldehyde, described in Japanese Laid-Open Patent Publication No. 2-141279.

[Laminated Conductive Sheet]

An additional functional layer such as an antireflection layer or a hard coat layer may be formed in the laminated conductive sheet.

The present invention may be appropriately combined with technologies described in the following patent publications and international patent pamphlets shown in Tables 1 and 2. "Japanese Laid-Open Patent", "Publication No.", "Pamphlet No.", and the like are omitted.

TABLE 1

| | | | | |
|---|---|---|---|---|
| 2004-221564 | 2004-221565 | 2007-200922 | 2006-352073 | 2007-129205 |
| 2007-235115 | 2007-207987 | 2006-012935 | 2006-010795 | 2006-228469 |
| 2006-332459 | 2009-21153 | 2007-226215 | 2006-261315 | 2007-072171 |
| 2007-102200 | 2006-228473 | 2006-269795 | 2006-269795 | 2006-324203 |
| 2006-228478 | 2006-228836 | 2007-009326 | 2006-336090 | 2006-336099 |
| 2006-348351 | 2007-270321 | 2007-270322 | 2007-201378 | 2007-335729 |
| 2007-134439 | 2007-149760 | 2007-208133 | 2007-178915 | 2007-334325 |
| 2007-310091 | 2007-116137 | 2007-088219 | 2007-207883 | 2007-013130 |
| 2005-302508 | 2008-218784 | 2008-227350 | 2008-227351 | 2008-244067 |
| 2008-267814 | 2008-270405 | 2008-277675 | 2008-277676 | 2008-282840 |
| 2008-283029 | 2008-288305 | 2008-288419 | 2008-300720 | 2008-300721 |
| 2009-4213 | 2009-10001 | 2009-16526 | 2009-21334 | 2009-26933 |
| 2008-147507 | 2008-159770 | 2008-159771 | 2008-171568 | 2008-198388 |
| 2008-218096 | 2008-218264 | 2008-224916 | 2008-235224 | 2008-235467 |
| 2008-241987 | 2008-251274 | 2008-251275 | 2008-252046 | 2008-277428 |

TABLE 2

| 2006/001461 | 2006/088059 | 2006/098333 | 2006/098336 | 2006/098338 |
|---|---|---|---|---|
| 2006/098335 | 2006/098334 | 2007/001008 | | |

EXAMPLES

The present invention will be described more specifically below with reference to Examples. Materials, amounts, ratios, treatment contents, treatment procedures, and the like, used in Examples, may be appropriately changed without departing from the scope of the present invention. The following specific Examples are therefore to be considered in all respects as illustrative and not restrictive.

First Example

Conductive sheets of Comparative Examples 1 and 2 and Examples 1 to 6 were subjected to surface resistance and transmittance measurement and moire and visibility evaluation. The components, measurement results, and evaluation results of Comparative Examples 1 and 2 and Examples 1 to 6 are shown in Table 3.

Examples 1 to 6 and Comparative Examples 1 and 2

(Photosensitive Silver Halide Material)

An emulsion containing an aqueous medium, a gelatin, and silver iodobromochloride particles was prepared. The amount of the gelatin was 10.0 g per 150 g of Ag, and the silver iodobromochloride particles had an I content of 0.2 mol %, a Br content of 40 mol %, and an average spherical equivalent diameter of 0.1 µm.

$K_3Rh_2Br_9$ and $K_2IrCl_6$ were added to the emulsion at a concentration of $10^{-7}$ mol/mol-silver to dope the silver bromide particles with Rh and Ir ions. $Na_2PdCl_4$ was further added to the emulsion, and the resultant emulsion was subjected to gold-sulfur sensitization using chlorauric acid and sodium thiosulfate. The emulsion and a gelatin hardening agent were applied to each of a first transparent substrate 12A and a second transparent substrate 12B (both composed of a polyethylene terephthalate (PET)) such that the amount of the applied silver was 10 g/m². The Ag/gelatin volume ratio was 2/1.

The PET support had a width of 30 cm, and the emulsion was applied thereto into a width of 25 cm and a length of 20 m. The both end portions having a width of 3 cm of the PET support were cut off to obtain a roll photosensitive silver halide material having a width of 24 cm.

(Exposure)

An A4 (210 mm×297 mm) sized area of the first transparent substrate 12A was exposed in the pattern of the first conductive sheet 10A shown in FIGS. 1 and 4, and an A4 sized area of the second transparent substrate 12B was exposed in the pattern of the second conductive sheet 10B shown in FIGS. 4 and 6. The exposure was carried out using a parallel light from a light source of a high-pressure mercury lamp and patterned photomasks.

(Development Treatment)

Formulation of 1 L of Developer

| Hydroquinone | 20 g |
|---|---|
| Sodium sulfite | 50 g |
| Potassium carbonate | 40 g |

-continued

| Ethylenediaminetetraacetic acid | 2 g |
|---|---|
| Potassium bromide | 3 g |
| Polyethylene glycol 2000 | 1 g |
| Potassium hydroxide | 4 g |
| pH | Controlled at 10.3 |

Formulation of 1 L of Fixer

| Ammonium thiosulfate solution (75%) | 300 ml |
|---|---|
| Ammonium sulfite monohydrate | 25 g |
| 1,3-Diaminopropanetetraacetic acid | 8 g |
| Acetic acid | 5 g |
| Aqueous ammonia (27%) | 1 g |
| pH | Controlled at 6.2 |

The exposed photosensitive materials were treated with the above treatment agents under the following conditions using an automatic processor FG-710PTS manufactured by FUJI-FILM Corporation. A development treatment was carried out at 35° C. for 30 seconds, a fixation treatment was carried out at 34° C. for 23 seconds, and then a water washing treatment was carried out for 20 seconds at a water flow rate of 5 L/min.

Example 1

In the first conductive sheet 10A and the second conductive sheet 10B produced in example 1, the conductive portions (the first conductive patterns 22A and the second conductive pattern 22B) had a line width of 1 µm, the small lattices 18 had a side length of 50 µm, and the large lattices (the first large lattices 14A and the second large lattices 14B) had a side length of 3 mm.

Example 2

The first and second conductive sheets of example 2 were produced in the same manner as example 1 except that the conductive portions had a line width of 5 µm and the small lattices 18 had a side length of 50 µm.

Example 3

The first and second conductive sheets of example 3 were produced in the same manner as example 1 except that the conductive portions had a line width of 9 µm, the small lattices 18 had a side length of 150 µm, and the large lattices had a side length of 5 mm.

Example 4

The first and second conductive sheets of example 4 were produced in the same manner as example 1 except that the conductive portions had a line width of 10 µm, the small lattices 18 had a side length of 300 µm, and the large lattices had a side length of 6 mm.

Example 5

The first and second conductive sheets of example 5 were produced in the same manner as example 1 except that the conductive portions had a line width of 15 µm, the small lattices 18 had a side length of 400 µm, and the large lattices had a side length of 10 mm.

Example 6

The first and second conductive sheets of example 6 were produced in the same manner as example 1 except that the conductive portions had a line width of 20 μm, the small lattices 18 had a side length of 500 μm, and the large lattices had a side length of 10 mm.

Comparative Example 1

The first and second conductive sheets of Comparative example 1 were produced in the same manner as example 1 except that the conductive portions had a line width of 0.5 μm, the small lattices 18 had a side length of 40 μm, and the large lattices had a side length of 3 mm.

Comparative Example 2

The first and second conductive sheets of Comparative example 2 were produced in the same manner as in Comparative example 1 except that the conductive portions had a line width of 25 μm, the small lattices 18 had a side length of 500 μm, and the large lattices had a side length of 10 mm.

(Surface Resistance Measurement)

In each of the first conductive sheets 10A and the second conductive sheets 10B, the surface resistivity values of optionally selected 10 areas were measured by LORESTA GP (Model No. MCP-T610) manufactured by Dia Instruments Co., Ltd. utilizing an in-line four-probe method (ASP), and the average of the measured values was obtained to evaluate the detection accuracy.

(Transmittance Measurement)

The transmittance of each of the first conductive sheets 10A and the second conductive sheets 10B was measured by a spectrophotometer to evaluate the transparency.

(Moire Evaluation)

In each of Examples 1 to 6 and Comparative Examples 1 and 2, the first conductive sheet 10A was stacked on the second conductive sheet 10B to obtain a laminated conductive sheet. The laminated conductive sheet was attached to a display screen of a liquid crystal display device to obtain a touch panel. The touch panel was fixed to a turntable, and the liquid crystal display device was operated to display a white color. The moire of the laminated conductive sheet was visually observed and evaluated while turning the turntable within a bias angle range of −45° to +45°.

The moire was observed at a distance of 1.5 m from the display screen of the liquid crystal display device. The laminated conductive sheet was evaluated as "Excellent" when the moire was not visible, as "Fair" when the moire was slightly visible to an acceptable extent, or as "Poor" when the moire was highly visible.

(Visibility Evaluation)

When the touch panel was fixed to the turntable and the liquid crystal display device was operated to display the white color before the moire evaluation, whether a thickened line or a black point was formed or not on the touch panel and whether a boundary between the first large lattice 14A and the second large lattice 14B in the touch panel was visible or not were observed by the naked eye.

TABLE 3

|  | Line width of conductive portion (μm) | Side length of small lattice (μm) | Side length of large lattice (mm) | Surface resistance (Ω/sq.) | Transmittance (%) | Moire evaluation | Visibility evaluation |
|---|---|---|---|---|---|---|---|
| Comparative example 1 | 0.5 | 40 | 3 | 1 k or more | 90 | Excellent | Excellent |
| example 1 | 1 | 50 | 3 | 80 | 90 | Excellent | Excellent |
| example 2 | 5 | 50 | 3 | 15 | 75 | Excellent | Excellent |
| example 3 | 9 | 150 | 5 | 25 | 86 | Excellent | Excellent |
| example 4 | 10 | 300 | 6 | 50 | 87 | Excellent | Excellent |
| example 5 | 15 | 400 | 10 | 45 | 86 | Excellent | Excellent |
| example 6 | 20 | 500 | 10 | 40 | 86 | Fair | Fair |
| Comparative example 2 | 25 | 500 | 10 | 33 | 83 | Poor | Poor |

As shown in Table 3, though the conductive sheets of Comparative example 1 had excellent results in the moire and visibility evaluation, they had a surface resistance of 1 kohm/sq or more. Thus, the conductive sheets of Comparative example 1 may exhibit a low conductivity and an insufficient detection sensitivity. Though the conductive sheets of Comparative example 2 had excellent conductivity and transmittance, the moire was highly visible, and the conductive portions per se were highly visible to the naked eye to deteriorate the visibility.

In contrast, among Examples 1 to 6, the conductive sheets of Examples 1 to 5 were excellent in the conductivity, transmittance, moire, and visibility. The conductive sheets of example 6 were inferior to those of Examples 1 to 5 in the moire and visibility evaluation, but the moire was only slightly visible to an acceptable extent, the image quality of the display device was not deteriorated.

Second Example

Laminated conductive sheets of Examples 11 to 25 were subjected to visibility evaluation. The components and evaluation results of Examples 11 to 25 are shown in Table 4.

Example 11

The first conductive sheet 10A was stacked on the second conductive sheet 10B as described in First example to obtain the laminated conductive sheet of Example 11. In Example 11, as shown in Table 4, the conductive portions (the first conductive patterns 22A and the second conductive patterns 22B) had a line width of 5 μm, the small lattices 18 had a side length of 50 μm, and the large lattices (the first large lattices 14A and the second large lattices 14B) had a side length of 3 mm (as in example 2 of First example). In example 11, the shift length in the third and fourth direction (hereinafter referred to as the shift length) was 2.5 µm.

Examples 12 and 13

The laminated conductive sheets of Examples 12 and 13 were produced in the same manner as in Example 11 except that the conductive portions had a line width of 8 µm, the small lattices 18 had a side length of 150 µm, the large lattices had a side length of 5 µm, and the shift lengths were 25 and 75 µm, respectively.

Examples 14 to 16

The laminated conductive sheets of Examples 14, 15, and 16 were produced in the same manner as in Example 11 except that the conductive portions had a line width of 8 µm, the small lattices 18 had a side length of 250 µm, the large lattices had a side length of 5 mm, and the shift lengths were 25, 75, and 125 µm, respectively.

Examples 17 to 20

The laminated conductive sheets of Examples 17, 18, 19, and 20 were produced in the same manner as in Example 11 except that the conductive portions had a line width of 10 µm, the small lattices 18 had a side length of 300 µm, the large lattices had a side length of 6 mm, and the shift lengths were 25, 75, 125, and 150 µm, respectively.

Examples 21 to 25

The laminated conductive sheets of Examples 21, 22, 23, 24, and 25 were produced in the same manner as in Example 11 except that the conductive portions had a line width of 15 µm, the small lattices 18 had a side length of 500 µm, the large lattices had a side length of 10 mm, and the shift lengths were 25, 75, 125, 150, and 250 µm, respectively.
Evaluation
(Visibility Evaluation)

In each of Examples 11 to 25, the laminated conductive sheet was attached to a display screen of a liquid crystal display device to obtain a touch panel. When the liquid crystal display device was operated to display a white color, whether a thickened line or a black point was formed or not on the touch panel and whether a boundary between the first large lattice 14A and the second large lattice 14B in the touch panel was visible or not were observed by the naked eye.

TABLE 4

| | Line width of conductive portion (µm) | Side length of small lattice (µm) | Side length of large lattice (mm) | Shift length (µm) | Visibility evaluation |
|---|---|---|---|---|---|
| Example 11 | 5 | 50 | 3 | 2.5 | Excellent |
| Example 12 | 8 | 150 | 5 | 25 | Excellent |
| Example 13 | 8 | 150 | 5 | 75 | Excellent |
| Example 14 | 8 | 250 | 5 | 25 | Excellent |
| Example 15 | 8 | 250 | 5 | 75 | Excellent |
| Example 16 | 8 | 250 | 5 | 125 | Excellent |
| Example 17 | 10 | 300 | 6 | 25 | Excellent |
| Example 18 | 10 | 300 | 6 | 75 | Excellent |
| Example 19 | 10 | 300 | 6 | 125 | Excellent |
| Example 20 | 10 | 300 | 6 | 150 | Excellent |
| Example 21 | 15 | 500 | 10 | 25 | Excellent |
| Example 22 | 15 | 500 | 10 | 75 | Excellent |

TABLE 4-continued

| | Line width of conductive portion (µm) | Side length of small lattice (µm) | Side length of large lattice (mm) | Shift length (µm) | Visibility evaluation |
|---|---|---|---|---|---|
| Example 23 | 15 | 500 | 10 | 125 | Excellent |
| Example 24 | 15 | 500 | 10 | 150 | Excellent |
| Example 25 | 15 | 500 | 10 | 250 | Excellent |

As shown in Table 4, all the laminated conductive sheets of Examples 11 to 25 had excellent results in the visibility evaluation. Thus, the shift length was at most ½ of the side length of the small lattices 18, so that the straight lines on the first large lattices 14A and the second large lattices 14B did not overlap with each other, and the visibility was not deteriorated. In addition, laminated conductive sheets produced by exposing the first conductive sheet 10A in the pattern shown in FIGS. 8 and 9 and by exposing the second conductive sheet 10B in the pattern shown in FIGS. 8 and 10 exhibited the same results.

Third Example

Laminated conductive sheets of Examples 31 to 45 were subjected to visibility evaluation. The components and evaluation results of Examples 31 to 45 are shown in Table 5.

Examples 31 to 45

Figure 13:
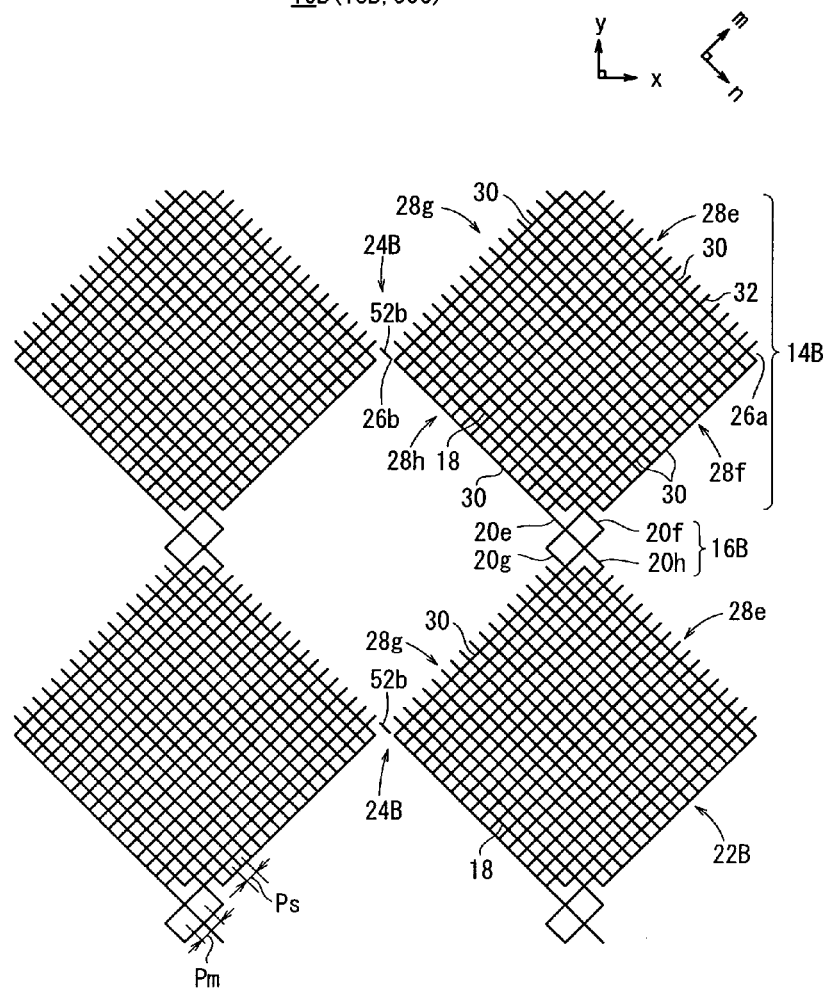
FIG. 13 is a plan view showing an example of a second conductive pattern formed on a second conductive sheet in the third laminated conductive sheet.

The laminated conductive sheets of Examples 31 to 45 were produced in the same manner as Examples 11 to 25 except that the first conductive sheet 10A was exposed in the pattern shown in FIG. 12 and the second conductive sheet 10B was exposed in the pattern shown in FIG. 13, respectively.

TABLE 5

| | Line width of conductive portion (µm) | Side length of small lattice (µm) | Side length of large lattice (mm) | Shift length (µm) | Visibility evaluation |
|---|---|---|---|---|---|
| Example 31 | 5 | 50 | 3 | 2.5 | Excellent |
| Example 32 | 8 | 150 | 5 | 25 | Excellent |
| Example 33 | 8 | 150 | 5 | 75 | Excellent |
| Example 34 | 8 | 250 | 5 | 25 | Excellent |
| Example 35 | 8 | 250 | 5 | 75 | Excellent |
| Example 36 | 8 | 250 | 5 | 125 | Excellent |
| Example 37 | 10 | 300 | 6 | 25 | Excellent |
| Example 38 | 10 | 300 | 6 | 75 | Excellent |
| Example 39 | 10 | 300 | 6 | 125 | Excellent |
| Example 40 | 10 | 300 | 6 | 150 | Excellent |
| Example 41 | 15 | 500 | 10 | 25 | Excellent |
| Example 42 | 15 | 500 | 10 | 75 | Excellent |
| Example 43 | 15 | 500 | 10 | 125 | Excellent |
| Example 44 | 15 | 500 | 10 | 150 | Excellent |
| Example 45 | 15 | 500 | 10 | 250 | Excellent |

All the laminated conductive sheets of Examples 31 to 45 had excellent results in the visibility evaluation. Particularly, in Examples 31 to 45, the first auxiliary line 52a and the second auxiliary line 52b were crossed to form a pattern like the small lattices, so that the visibility was not deteriorated. Furthermore, the shift length was at most ½ of the side length of the small lattices 18, so that the straight lines on the first large lattices 14A and the second large lattices 14B did not overlap with each other, and the visibility was not deteriorated. In addition, laminated conductive sheets produced by exposing the first conductive sheet 10A in the pattern shown in FIG. 15 and by exposing the second conductive sheet 10B in the pattern shown in FIG. 16 exhibited the same results.

Each of the laminated conductive sheets of Examples 1 to 6, Examples 11 to 25, and Examples 31 to 45 was used to produce a projected capacitive touch panel. When the touch panel was operated by a finger touch, the touch panel exhibited a high response speed and an excellent detection sensitivity. Furthermore, when two or more points were touched, the touch panel exhibited the same excellent properties. Thus, it was confirmed that the touch panel was capable of multi-touch detection.

It is to be understood that the conductive sheet, the conductive sheet using method, and the touch panel of the present invention are not limited to the above embodiments, and various changes and modifications may be made therein without departing from the scope of the present invention.

The invention claimed is:

1. A conductive sheet comprising two or more conductive large lattices and a connection for electrically connecting the adjacent large lattices formed on a substrate, wherein
the large lattices each contain a combination of two or more small lattices,
the connection contains a plurality of medium lattices arranged in a zigzag manner, and
a size of the medium lattices is larger than that of the small lattices and smaller than that of the large lattices.

2. The conductive sheet according to claim 1, wherein the two or more large lattices are arranged in one direction with the connection disposed therebetween.

3. The conductive sheet according to claim 1, wherein the two or more large lattices are arranged in a first direction with the connection disposed therebetween to form a conductive pattern,
two or more of the conductive patterns are arranged in a second direction perpendicular to the first direction, and
an electrically isolated insulation is disposed between the adjacent conductive patterns.

4. The conductive sheet according to claim 1, wherein the medium lattices have a shape similar to the small lattices.

5. The conductive sheet according to claim 1, wherein the small lattices have a polygonal shape.

6. The conductive sheet according to claim 5, wherein the small lattices have a square shape.

7. A conductive sheet comprising a substrate, a first conductive part formed on one main surface of the substrate, and a second conductive part formed on the other main surface of the substrate, wherein
the first conductive part contains two or more first conductive patterns composed of a thin metal wire,
the first conductive patterns each extend in a first direction and are arranged in a second direction perpendicular to the first direction,
the second conductive part contains two or more second conductive patterns composed of a thin metal wire,
the second conductive patterns each extend in the second direction and are arranged in the first direction,
the first conductive patterns each contain two or more first large lattices connected in series in the first direction,
the second conductive patterns each contain two or more second large lattices connected in series in the second direction,
the first large lattices and the second large lattices each contain a combination of two or more small lattices,
the thin metal wire has a line width of 1 to 15 µm,
the small lattices have a side length of 50 to 500 µm, the first conductive part further contains an electrically isolated first insulation between the first conductive patterns,
the second conductive part further contains an electrically isolated second insulation between the second conductive patterns,
the first conductive patterns and the second conductive patterns are crossed to form an arrangement of a large number of lattices as viewed from above,
the first insulation and the second insulation overlap with each other to form a combined pattern between the first conductive patterns and the second conductive patterns, and
the combined pattern contains an opening having the same size as two or more of the lattices arranged.

8. The conductive sheet according to claim 7, wherein the combined pattern contains an opening having the same size as two or more of the small lattices arranged.

9. A conductive sheet comprising a substrate, a first conductive part formed on one main surface of the substrate, and a second conductive part formed on the other main surface of the substrate, wherein
the first conductive part contains two or more first conductive patterns composed of a thin metal wire,
the first conductive patterns each extend in a first direction and are arranged in a second direction perpendicular to the first direction,
the second conductive part contains two or more second conductive patterns composed of a thin metal wire,
the second conductive patterns each extend in the second direction and are arranged in the first direction,
the first conductive patterns each contain two or more first large lattices connected in series in the first direction,
the second conductive patterns each contain two or more second large lattices connected in series in the second direction,
the first large lattices and the second large lattices each contain a combination of two or more small lattices,
the thin metal wire has a line width of 1 to 15 µm,
the small lattices have a side length of 50 to 500 µm,
the adjacent first large lattices are electrically connected by a first connection,
the adjacent second large lattices are electrically connected by a second connection,
the first connection and the second connection each contain one or more medium lattices,
a pitch of the medium lattices is n times larger than that of the small lattices (in which n is a real number larger than 1),
a size of the medium lattices is larger than that of the small lattices and smaller than that of the large lattices,
the first conductive part further contains an electrically isolated first insulation between the first conductive patterns,
the second conductive part further contains an electrically isolated second insulation between the second conductive patterns,
the first conductive patterns and the second conductive patterns are crossed to form an arrangement of a large number of lattices as viewed from above,
the first insulation and the second insulation overlap with each other to form a combined pattern between the first conductive patterns and the second conductive patterns, and
the combined pattern contains an opening having the same size as the medium lattice.

10. A conductive sheet comprising a substrate, a first conductive part formed on one main surface of the substrate, and a second conductive part formed on the other main surface of the substrate, wherein
  the first conductive part contains two or more first conductive patterns composed of a thin metal wire,
  the first conductive patterns each extend in a first direction and are arranged in a second direction perpendicular to the first direction,
  the second conductive part contains two or more second conductive patterns composed of a thin metal wire,
  the second conductive patterns each extend in the second direction and are arranged in the first direction,
  the first conductive patterns each contain two or more first large lattices connected in series in the first direction,
  the second conductive patterns each contain two or more second large lattices connected in series in the second direction,
  the first large lattices and the second large lattices each contain a combination of two or more small lattices,
  the thin metal wire has a line width of 1 to 15 μm,
  the small lattices have a side length of 50 to 500 μm,
  the first conductive part further contains an electrically isolated first insulation between the first conductive patterns,
  the second conductive part further contains an electrically isolated second insulation between the second conductive patterns,
  the first conductive patterns and the second conductive patterns are crossed to form an arrangement of a large number of lattices as viewed from above,
  the first insulation and the second insulation overlap with each other to form a combined pattern between the first conductive patterns and the second conductive patterns, and
  the combined pattern contains an opening having the same size as a plurality of the small lattices arranged in an approximately cross shape.

11. A conductive sheet comprising a substrate, a first conductive part formed on one main surface of the substrate, and a second conductive part formed on the other main surface of the substrate, wherein
  the first conductive part contains two or more first conductive patterns composed of a thin metal wire,
  the first conductive patterns each extend in a first direction and are arranged in a second direction perpendicular to the first direction,
  the second conductive part contains two or more second conductive patterns composed of a thin metal wire,
  the second conductive patterns each extend in the second direction and are arranged in the first direction,
  the first conductive patterns each contain two or more first large lattices connected in series in the first direction,
  the second conductive patterns each contain two or more second large lattices connected in series in the second direction,
  the first large lattices and the second large lattices each contain a combination of two or more small lattices,
  the thin metal wire has a line width of 1 to 15 μm,
  the small lattices have a side length of 50 to 500
  a large number of needle-like lines extend from a continuous straight line to form a comb-like shape along a first side of the first large lattice,
  a continuous straight line is formed along a second side of the first large lattice facing the first side,
  a continuous straight line is formed along a third side of the second large lattice facing the first side of the first large lattice, and
  a large number of needle-like lines extend from a continuous straight line to form a comb-like shape along a fourth side of the second large lattice facing the second side of the first large lattice.

12. A conductive sheet comprising a substrate, a first conductive part formed on one main surface of the substrate, and a second conductive part formed on the other main surface of the substrate, wherein
  the first conductive part contains two or more first conductive patterns composed of a thin metal wire,
  the first conductive patterns each extend in a first direction and are arranged in a second direction perpendicular to the first direction,
  the second conductive part contains two or more second conductive patterns composed of a thin metal wire,
  the second conductive patterns each extend in the second direction and are arranged in the first direction,
  the first conductive patterns each contain two or more first large lattices connected in series in the first direction,
  the second conductive patterns each contain two or more second large lattices connected in series in the second direction,
  the first large lattices and the second large lattices each contain a combination of two or more small lattices,
  the thin metal wire has a line width of 1 to 15 μm,
  the small lattices have a side length of 50 to 500 μm,
  the first conductive part further contains a plurality of first insulations containing a first auxiliary line composed of a thin metal wire between the first conductive patterns,
  the second conductive part further contains a plurality of second insulations containing a second auxiliary line composed of a thin metal wire between the second conductive patterns,
  the first conductive patterns and the second conductive patterns are crossed as viewed from above,
  the first insulation and the second insulation overlap with each other to form a combined pattern between the first conductive patterns and the second conductive patterns,
  the combined pattern has the first auxiliary line and the second auxiliary line crossed which do not overlap with the first conductive patterns and the second conductive patterns,
  the first auxiliary line is a straight line separated from the first large lattices, and
  the second auxiliary line is a straight line separated from the second large lattices.

13. The conductive sheet according to claim 12, wherein
  the first auxiliary line and the second auxiliary line each have a length approximately equal to the side length of the small lattices.

14. The conductive sheet according to claim 12, wherein
  the small lattices have a square shape, and
  the combined pattern has the first auxiliary line and the second auxiliary line perpendicularly crossed which do not overlap with the first conductive patterns and the second conductive patterns.

15. The conductive sheet according to claim 12, wherein
  the small lattices have a rhombic shape, and
  the combined pattern has the first auxiliary line and the second auxiliary line crossed at an angle approximately equal to the vertex angle of the rhombic shape of the small lattice, the first auxiliary line and the second auxiliary line forming the combined pattern which does not overlap with the first conductive patterns and the second conductive patterns.

16. A conductive sheet comprising a substrate, wherein
two or more conductive first large lattices and a first connection for electrically connecting the adjacent first large lattices are formed on one main surface of the substrate,
two or more conductive second large lattices and a second connection for electrically connecting the adjacent second large lattices are formed on the other main surface of the substrate,
the first large lattices and the second large lattices each contain a combination of two or more small lattices,
the first connection and the second connection each contain a plurality of medium lattices arranged in a zigzag manner, and
a size of the medium lattices is larger than that of the small lattices and smaller than that of the large lattices.

17. The conductive sheet according to claim 16, wherein
the two or more first large lattices are arranged in a first direction with the first connection disposed therebetween to form a first conductive pattern,
the two or more second large lattices are arranged in a second direction perpendicular to the first direction with the second connection disposed therebetween to form a second conductive pattern,
two or more of the first conductive patterns are arranged in the second direction,
two or more of the second conductive patterns are arranged in the first direction,
an electrically isolated first insulation is disposed between the adjacent first conductive patterns,
an electrically isolated second insulation is disposed between the adjacent second conductive patterns,
the first connection and the second connection are arranged facing each other with the substrate in between, and
the first insulation and the second insulation are arranged facing each other with the substrate in between.

* * * * *